(12) United States Patent
Tenmyo

(10) Patent No.: US 7,697,838 B2
(45) Date of Patent: Apr. 13, 2010

(54) ILLUMINATION APPARATUS AND IMAGE-TAKING APPARATUS

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1363 days.

(21) Appl. No.: 11/133,847

(22) Filed: May 20, 2005

(65) Prior Publication Data

US 2005/0264686 A1 Dec. 1, 2005

(30) Foreign Application Priority Data

May 31, 2004 (JP) .............................. 2004-162279

(51) Int. Cl.
*G03B 15/06* (2006.01)
(52) U.S. Cl. ...................... 396/200; 396/199
(58) Field of Classification Search .................. 396/155, 396/199, 200; 348/370
See application file for complete search history.

(56) References Cited

U.S. PATENT DOCUMENTS

| | | | | | |
|---|---|---|---|---|---|
| 3,875,456 | A | * | 4/1975 | Kano et al. | 313/501 |
| 5,526,190 | A | * | 6/1996 | Hubble et al. | 359/719 |
| 6,016,406 | A | * | 1/2000 | Lungershausen | 396/200 |
| 6,078,752 | A | | 6/2000 | Tenmyo | |
| 6,547,423 | B2 | * | 4/2003 | Marshall et al. | 362/333 |
| 6,724,543 | B1 | * | 4/2004 | Chinniah et al. | 359/718 |
| 7,204,607 | B2 | * | 4/2007 | Yano et al. | 362/231 |
| 7,254,323 | B2 | * | 8/2007 | Tenmyo | 396/200 |
| 2002/0080615 | A1 | * | 6/2002 | Marshall et al. | 362/333 |
| 2002/0097579 | A1 | | 7/2002 | Stalions | |
| 2003/0189829 | A1 | * | 10/2003 | Shimizu et al. | 362/240 |
| 2004/0100192 | A1 | * | 5/2004 | Yano et al. | 313/512 |
| 2006/0186425 | A1 | | 8/2006 | Yano et al. | |
| 2007/0189007 | A1 | * | 8/2007 | Nishimoto et al. | 362/227 |

FOREIGN PATENT DOCUMENTS

| | | |
|---|---|---|
| CN | 1860329 | 11/2006 |
| JP | 10-201703 | 1/1998 |
| JP | 10-164315 | 6/1998 |
| JP | 10-242513 | 9/1998 |
| JP | 2000-089318 | 3/2000 |
| JP | 2004-039334 A | 2/2004 |
| WO | WO 02/052656 A1 | 7/2002 |

OTHER PUBLICATIONS

The above reference was cited in a Mar. 17, 2009 Japanese Office Action that issued in Japanese Patent Application No. 2004-162279.

* cited by examiner

*Primary Examiner*—Rodney E Fuller
(74) *Attorney, Agent, or Firm*—Cowan, Liebowitz & Latman, P.C.

(57) ABSTRACT

An illumination apparatus which can efficiently condense light from a light source such as an LED. The illumination apparatus has a light source and an optical member disposed on the side of light irradiation of the light source. The optical member has an incident surface, an emergent surface having a positive optical power, and a reflecting surface reflecting part of light from the incident surface and leading it to the emergent surface. The reflecting surface is formed further away from an irradiation optical axis than a normal to the emergent surface at a position of the emergent surface closest to the reflecting surface.

6 Claims, 15 Drawing Sheets

ILLUMINATION APPARATUS AND IMAGE-TAKING APPARATUS

BACKGROUND OF THE INVENTION

The present invention relates to an illumination apparatus, which has an optical member for efficiently condensing luminous flux emerging from a light source such as a light-emitting diode to a required irradiation area, and an image-taking apparatus, which has the illumination apparatus.

Conventionally, a number of illumination apparatuses employing a light-emitting diode (hereinafter abbreviated to "LED") as a light source have been put into practical use in which the LED is provided with a light-condensing function. The LED of this type is formed to have a light-emitting diode chip fixed inside a metal cup serving as a reflecting mirror and a dome-shaped transparent resin having a light-condensing function formed on the front surface (the surface on the emergence side) of the metal cup.

The LED of the aforementioned structure can provide different degrees of light condensing by changing the diameter or curvature of the portion of the transparent resin. An apparatus which employs such an LED has been proposed (for example, Japanese Patent Laid-Open No. 10-21703).

On the other hand, another proposed optical system has an LED as a light source without any light-condensing function and has a convex lens disposed on the light irradiation side of the light source and condensing luminous flux emerging from the light source (for example, Japanese Patent Laid-Open No. 2000-89318).

Yet another proposed optical system has an LED as a light source without any light-condensing function and has a prism which is used to reflect luminous flux emerging from the light source and to send the luminous flux toward a particular irradiation area (for example, Japanese Patent Laid-Open No. 10-164315).

Conventionally, the dome type LED having the light-condensing function has an optically optimal arrangement for the light-emitting diode chip serving as the light source to realize an optical system with a high level of light condensing, although it often depends on the optical specifications of the LED. Specifically, no problem occurs when it is possible to select an LED which can irradiate light to an optimal irradiation area required for an optical device on which the LED is mounted, but the irradiation area of an LED is not always identical to the optimal irradiation area of the optical device.

If the existing LED having the optical characteristic (irradiation angle) described above is used to attempt to irradiate light to the optimal irradiation area of an optical device, another optical system (optical member) is required as in the structure shown in Japanese Patent Laid-Open No. 10-21703. In this case, the addition of the other optical system increases the size or cost of the resulting illumination apparatus.

On the other hand, the LED of a surface emitting type which has no lens formed integrally on the front surface generally uses a convex lens disposed on the side of light irradiation to condense light as shown in Japanese Patent Laid-Open No. 2000-89318. When the convex lens is used to condense light, the focus length of the lens can be set appropriately to illuminate a particular area including an irradiation optical axis within the light irradiation area, but space is left between the LED as the light source and the convex lens.

Thus, part of luminous flux emerging from the LED escapes from the space to reduce the irradiation efficiency of the illumination light.

In the light-condensing optical system which uses the convex lens to utilize only refracted light, while the central area (the area near the irradiation optical axis) of the light irradiation area can be irradiated relatively brightly, sufficient illuminance is difficult to ensure in peripheral areas other than the central area. It is thus difficult to provide illumination of uniform brightness over the entire required irradiation area.

Optical systems which use the LED of the surface-emitting type having no lens formed integrally therewith to change the direction of light emergence typically include the illumination optical system which has a prism surface and a reflecting surface arranged on the front surface of the light source (on the side of light irradiation) to send light in a predetermined direction while the light is redirected and condensed, as shown in Japanese Patent Laid-Open No. 10-164315.

In the aforementioned illumination optical system, however, luminous flux near the irradiation optical axis is merely condensed sequentially while the emergence direction thereof is changed by refraction or reflection, and the optical system is not formed to improve the light-condensing efficiency by making use of refraction and reflection.

Since luminous flux deviated from the irradiation optical axis may travel in a direction different from a desired direction (direction in design), the optical system is not preferable in terms of efficient and uniform irradiation of luminous flux emerging from the LED to a particular area on the irradiation surface.

In this manner, the conventional illumination optical system using the LED is formed to condense luminous flux by utilizing one of the two optical effects, that is, refraction or reflection. In such a structure, however, the luminous flux emerging from the LED cannot be necessarily used efficiently as described above, and the illuminance distribution in the illumination area is not always uniform.

In other words, when the single lens is used to condense luminous flux emerging from the small light source such as the LED, the central area near the irradiation optical axis is irradiated brightly, but peripheral areas other than the central area are extremely dark in a light distribution characteristic typically shown.

When a light source having LED elements of a plurality of colors packaged together for a single condenser lens is used, these LED elements are arranged at different positions and it is difficult to match the irradiation areas of the respective LED elements. This results in unevenly distributed light and uneven color.

It is contemplated that each surface of an optical member is made as a diffusing surface or a material of the optical member contains a component for diffusing luminous flux as a measure to prevent the aforementioned unevenly distributed light and uneven color. When the diffusing component is contained, however, it is generally known that the irradiation efficiency is extremely reduced, and an optical system cannot be formed with high irradiation efficiency. It is thus preferable to employ a structure in which luminous flux from the light source is sent by using only the optical action such as refraction and reflection.

BRIEF SUMMARY OF THE INVENTION

It is an object of the present invention to provide an illumination apparatus, which can efficiently condense light from a light source such as an LED. It is another object of the present invention to provide an illumination apparatus in which uneven light distribution and uneven color can be reduced.

According to an aspect, the present invention provides an illumination apparatus having a light source and an optical member, which is disposed on the light irradiation side of the light source. The optical member includes an incident surface, an emergent surface, which has a positive optical power, and a reflecting surface, which reflects part of light from the incident surface and leads it to the emergent surface. The reflecting surface is formed further away from an irradiation optical axis than a normal to the emergent surface at a position of the emergent surface closest to the reflecting surface.

According to another aspect, the present invention provides an illumination apparatus having a light source which emits first light and second light including a color component different from the first light, and an optical member which is disposed on the side of light irradiation of the light source. The optical member includes a first surface, which transmits the first light therethrough and has a positive optical power, and a second surface, which reflects the second light toward the light irradiation side and has a positive optical power.

An image-taking apparatus can be constituted by one of the illumination apparatuses and an image-taking system, which takes an image of an object illuminated with light from the illumination apparatus.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

FIGS. 1 to 7 are diagrams for explaining an illumination unit (illumination apparatus) of Embodiment 1 of the present invention and a video camera (image-taking apparatus) having the illumination unit. The illumination unit of Embodiment 1 can efficiently condense luminous flux emerging from a minute surface light source such as an LED as described below.

Figure 1:
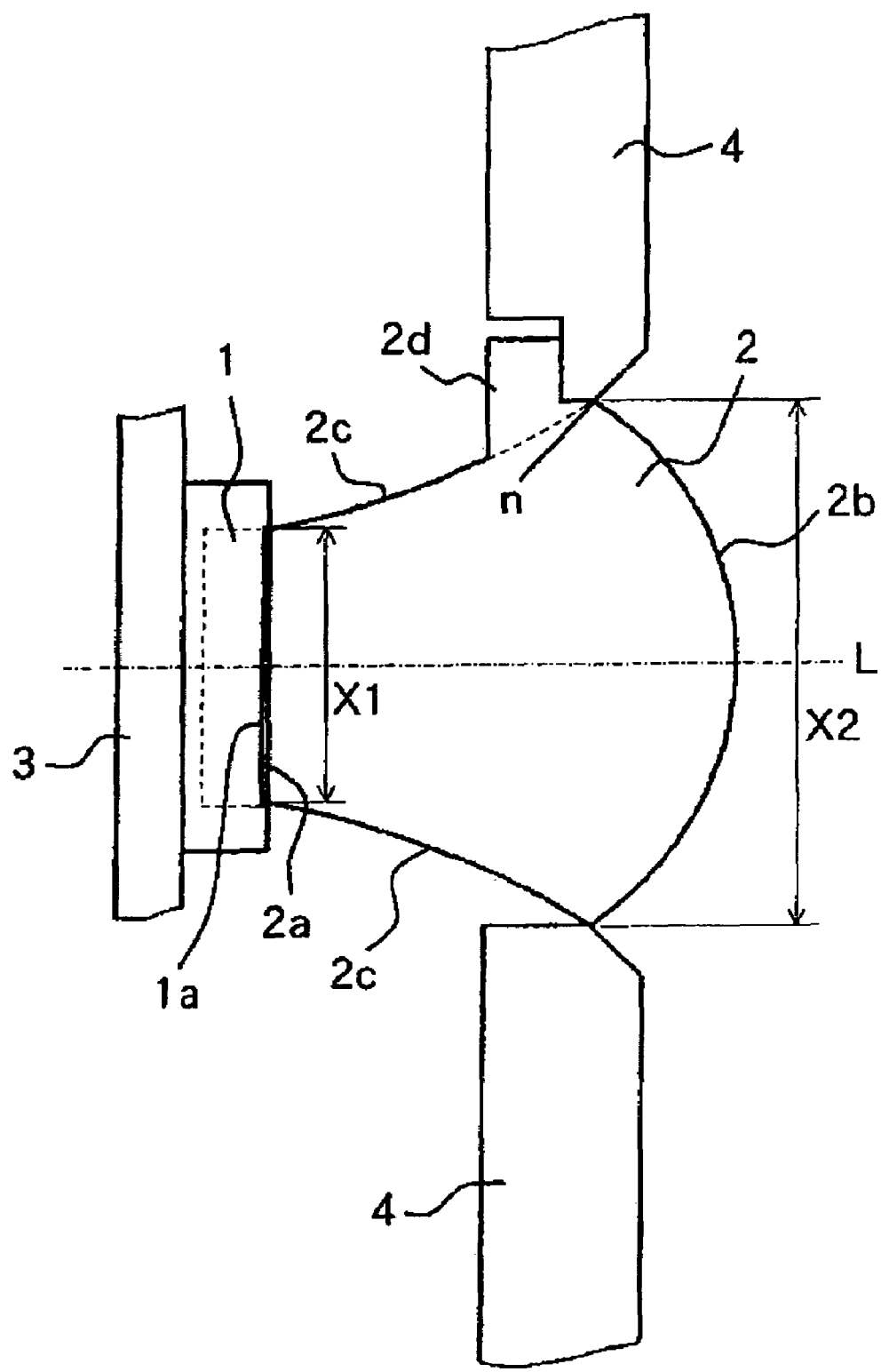
FIG. 1 is a longitudinal section view showing the structure of an illumination unit, which is Embodiment 1 of the present invention.
Figure 2:
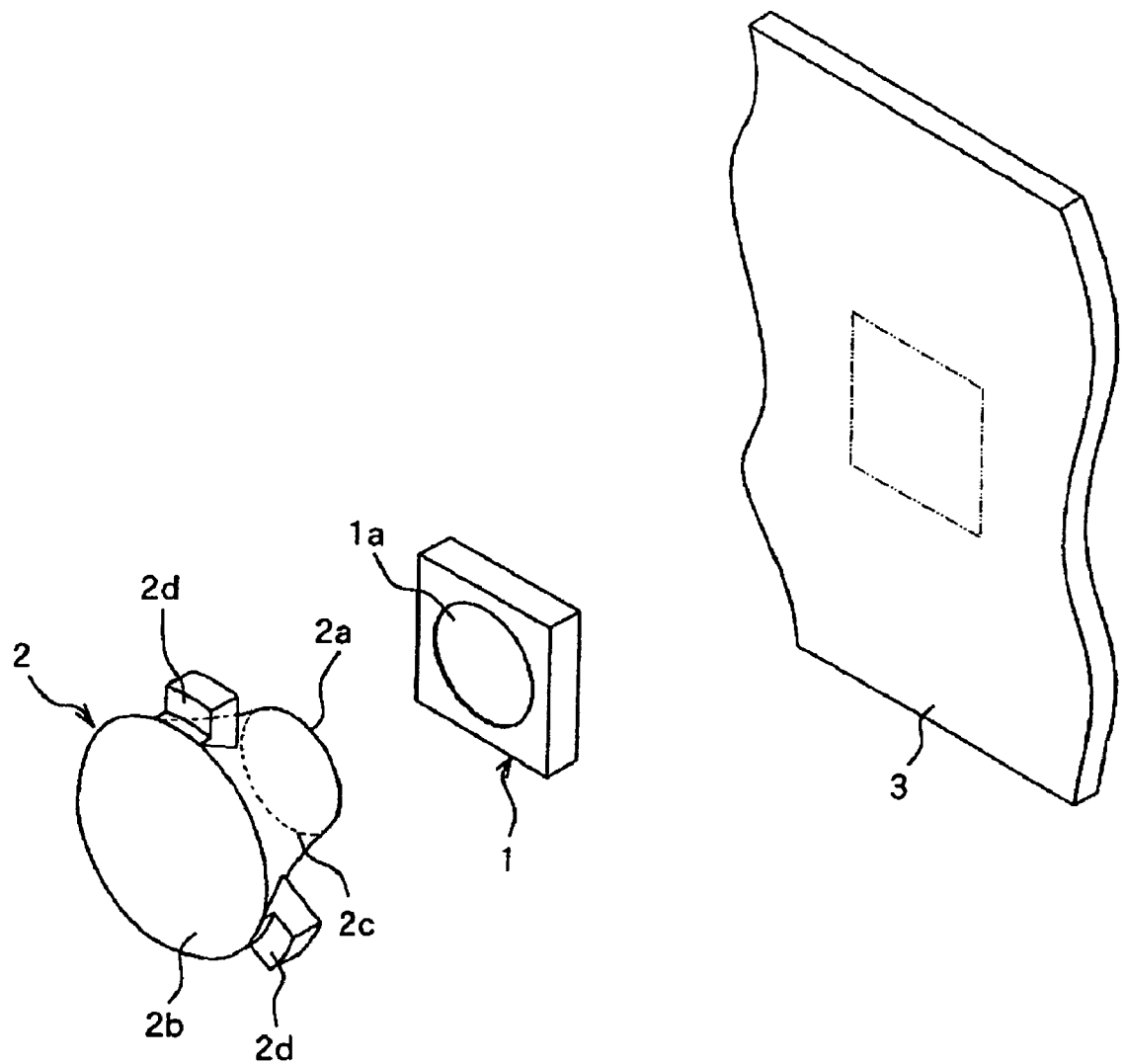
FIG. 2 is a perspective view showing the outer appearance of the illumination unit of Embodiment 1.
Figure 3:
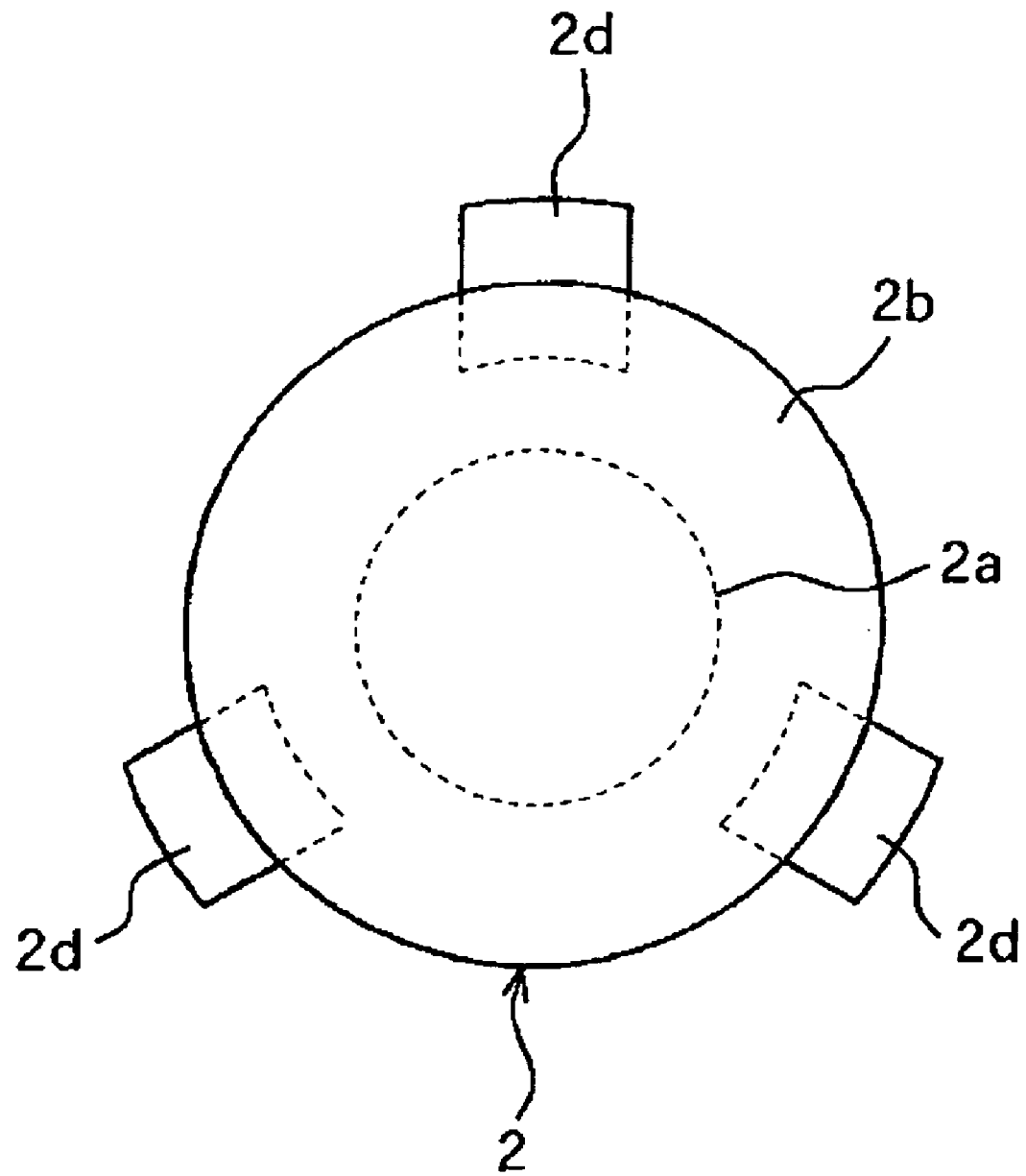
FIG. 3 is a front view showing an optical member in the illumination unit of Embodiment 1.

FIG. 1 is a longitudinal section view showing the structure of the illumination unit of Embodiment 1. FIG. 2 is a perspective view showing the outer appearance of main optical systems of the aforementioned illumination unit. FIG. 3 is a front view showing an optical member disposed inside the aforementioned illumination unit.

FIGS. 4A to 4I are diagrams for explaining the light distribution characteristic of the aforementioned illumination unit and show the traces of luminous flux incident on the light source from the side of light irradiation. FIGS. 4A to 4I are the diagrams obtained when the angle of the aforementioned luminous flux with respect to an irradiation optical axis is changed in increments of 5 degrees in the range from zero to 40 degrees.

FIGS. 5A to 5G are diagrams for explaining the light distribution characteristic of a conventional illumination unit when a condenser lens is used therein instead of the optical member in the illumination unit of Embodiment 1. FIGS. 5A to 5G also show the traces of luminous flux incident on a light source from the side of light irradiation.

Figure 6:
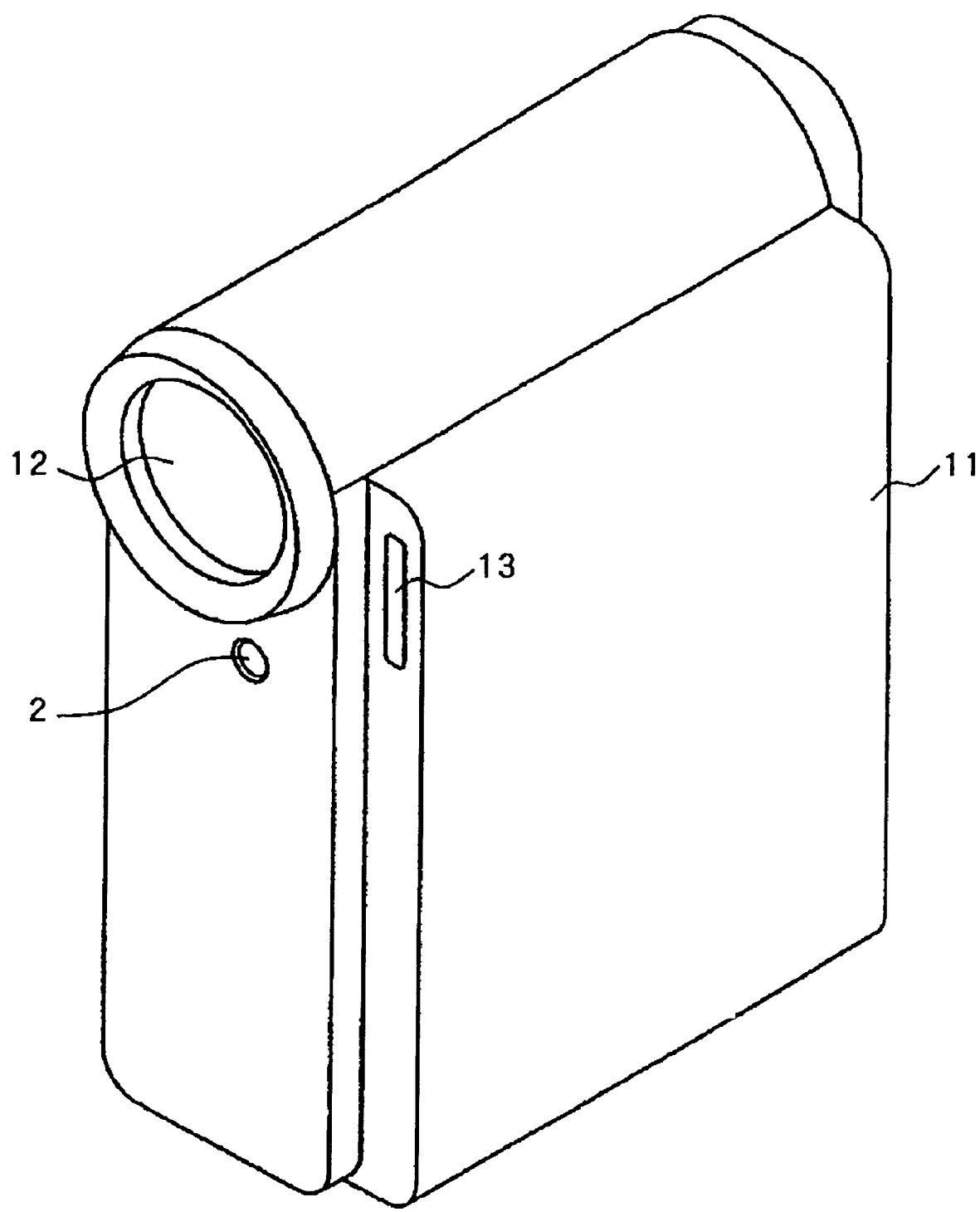
FIG. 6 is a perspective view showing the outer appearance of a video camera having the illumination unit of Embodiment 1.
Figure 7:
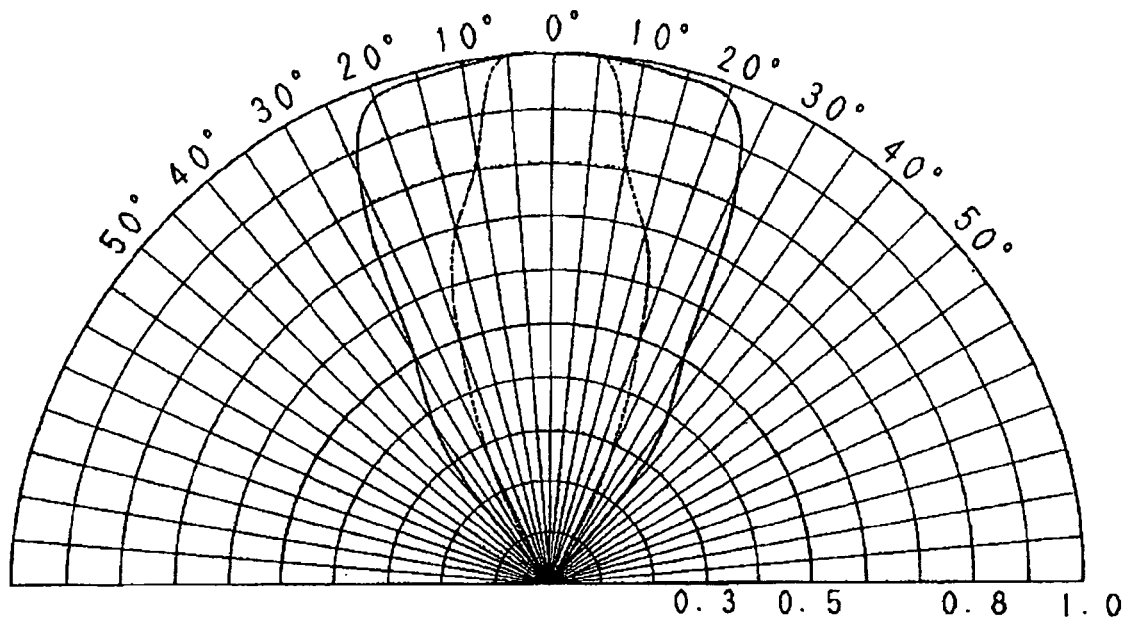
FIG. 7 is a graph showing the light distribution characteristic of the illumination unit of Embodiment 1.

FIG. 6 is a perspective view showing the outer appearance of the video camera having the illumination unit of Embodiment 1. FIG. 7 is a graph showing the light distribution characteristic of the illumination unit of Embodiment 1.

In FIG. 1 and the like, reference numeral 1 shows an LED serving as the light source, and reference numeral 2 shows the optical member for condensing luminous flux emerging from the LED 1. Reference numeral 3 shows a hard substrate which is electrically connected to the LED 1 and holds the LED 1. Reference numeral 4 shows an exterior member for a video camera body 11, later described.

In FIG. 6, reference numeral 11 shows the video camera body, 12 a lens barrel having an image-taking lens, and 13 an electronic flash light-emitting portion for irradiating illumination light toward an object. As shown in FIG. 6, the illumination unit of Embodiment 1 is disposed near the lens barrel 12 (below the lens barrel 12 in FIG. 6) in the front of the video camera body 11. The illumination unit (optical member 2) of Embodiment 1 can efficiently condense luminous flux emerging from the LED 1 held inside the video camera body 11.

It should be noted that the structure of the video camera except the illumination unit is known and detailed description thereof will be omitted. In addition, the structure of the video camera is not limited to that shown in FIG. 6.

Next, the structure of the illumination unit of Embodiment 1 will be described in detail.

The LED 1 is a white-color LED of high luminance capable of sending luminous flux with a uniform characteristic in the direction of light emergence and emitting fixed light for a certain time period (generally, light emitted for a longer time period than that of flash light in constant light quantity). The LED 1 converts luminous flux emerging from an LED chip to have a uniform light distribution characteristic by a diffusing surface formed in front of its emergent surface. As a result, a light-emitting surface 1a of a generally circular shape shown in FIG. 2 can be handled as a collection of minute light sources having a uniform light distribution characteristic regardless of light-emitting positions.

The LED 1 is electrically and mechanically connected to the hard substrate 3 through soldering or the like, and emits light in response to a control signal from a CPU, not shown, through the hard substrate 3. The hard substrate 3 is fixed at a predetermined position inside the video camera body 11 by a fixing member, not shown, specifically at a position where the most efficient function as an illumination optical system is attained.

The optical member 2 is an optical member for condensing luminous flux emerging from the LED 1 and is formed of a highly transparent (rate of attenuation almost equal to zero) resin material. The optical member 2 has an incident surface 2a, an emergent surface 2b, and a reflecting surface 2c, later described.

The incident surface 2a of the optical member 2 on which the luminous flux emitting from the LED 1 is incident has a generally circular outer shape when viewed from the side of the LED 1 and is generally orthogonal to an irradiation optical axis L (or may be inclined with respect to the irradiation optical axis L in association with a mechanical error).

The size (diameter) of the incident surface 2a is generally equal to the size (diameter) of the light-emitting surface 1a of the LED 1 (or an error may occur depending on accuracy in forming the optical member 2 or the like). The optical member 2 is arranged relative to the LED 1 such that the incident surface 2a is disposed immediately before the light-emitting surface 1a and is opposed to the light-emitting surface 1a on the irradiation optical axis L.

If the size of the incident surface 2a is smaller than the size of the light-emitting surface 1a, all of the light emitted from the light-emitting surface 1a cannot be incident on the incident surface 2a. If the size of the incident surface 2a is larger than the size of the light-emitting surface 1a, the optical member 2 is increased in size, or the luminous flux reaching the peripheral portions of the incident surface 2a is reduced to result in uneven light distribution on the incident surface, causing variations in light intensity. For these reasons, the incident surface 2a and the light-emitting surface 1a are formed to have substantially the same size to prevent the occurrence of the aforementioned problems.

The light-emergent surface 2b of the optical member 2 is a lens surface that has a positive refractive power (a positive optical power: the optical power is the reciprocal of a focal length) as shown in FIG. 1 and the like. Part of the luminous flux emerging from the LED 1 and incident on the incident surface 2a is directly sent toward the emergent surface 2b and then is condensed by refraction at the emergent surface 2b.

The aperture of the emergent surface 2b is larger than the aperture of the incident surface 2a when the optical member 2 is viewed from the irradiation optical axis L. Specifically, as shown in FIG. 1, a diameter x2 of the emergent surface 2b is larger than a diameter x1 of the incident surface 2a.

The reflecting surface 2c of the optical member 2 reflects the remainder of the luminous flux emerging from the LED 1 and incident on the incident surface 2a and guides it to the emergent surface 2b. The reflecting surface 2c has one end in contact with the incident surface 2a and the other end in contact with the emergent surface 2b. The reflecting surface 2c is formed as a curved surface. Specifically, the shape of the reflecting surface 2c is formed such that the area (diameter) of the cross section of the optical member 2 along a plane orthogonal to the irradiation optical axis L continuously increases toward the emergent surface 2b from the incident surface 2a.

At least part of the reflecting surface 2c closer to the emergent surface 2b (or it may be the entire reflecting surface 2c) is formed further away from the irradiation optical axis L than a normal n to the emergent surface 2b at the end of the emergent surface 2b (the boundary between the emergent surface 2b and the reflecting surface 2c) as shown in FIG. 1. Specifically, in a plane orthogonal to the irradiation optical axis L, the distance from the irradiation optical axis L to the reflecting surface 2c is larger than the distance from the irradiation optical axis L to the normal n.

Next, the shape of the reflecting surface 2c in Embodiment 1 will be described in more detail.

The part of the reflecting surface 2c in contact with the emergent surface 2b is shaped to be close to the normal n drawn at the end in the periphery of the emergent surface 2b. This is an effective shape for continuously connecting part of the luminous flux incident on the incident surface 2a that is sent directly to the end of the emergent surface 2b with part of the luminous flux reflected near the end of the emergent surface 2b and then sent. In other words, the aforementioned surface shape can be used to provide the direct light directly reaching the end of the emergent surface 2b and the reflected light through the reflecting surface 2c at substantially equal angles, thereby making it possible to avoid discontinuity of the luminous flux traveling to the boundary between the emergent surface and the reflecting surface.

On the other hand, the shape of the other portions of the reflecting surface 2c is determined as described below.

For the part of the reflecting surface 2c in contact with the incident surface 2a, the position of the end point is regulated for providing substantially the same size as the light-emitting surface 1a as described above. The intermediate part connecting both ends is formed as a curved surface in a folding-fan shape. The part is formed as the curved surface for the following reason. Essentially, the part of the luminous flux reflected by the reflecting surface 2c corresponds to a component which is once refracted by the incident surface 2a formed as a flat surface.

In the optical system having the relatively short optical member 2 as shown in Embodiment 1, a small component reaches the reflecting surface 2c and the component has relatively narrow angular distribution. On the other hand, it is desirable in Embodiment 1 that the angular distribution of the reflected light is substantially equal to the angular distribution of the direct light.

Thus, in Embodiment 1, the reflecting surface 2c is formed as the curved surface of the folding-fan shape in order to provide a wider angular distribution of the luminous flux reaching the reflecting surface 2c to achieve a uniformly distributed light characteristic.

To simplify the description, the characteristic of the angular distribution of luminous flux applied to the reflected surface 2c will be described when the curved shape is formed as an arc. Description will be made of an arc reflecting surface and a linear reflecting surface in section to facilitate the description.

First, for the linear section, the divergence of the luminous flux after the reflection is not changed from that before the reflection. Next, when the center of the arc is located between the arc and the axis of the emerging light, the angular distribution after the reflection can be narrowed. In contrast, when the center of the arc is located across the arc from the axis of the emerging light, that is, when the folding-fan shape is used as in Embodiment 1, the angular distribution of the luminous flux after the reflection can be widened by the reflecting surface.

Next, the curvature of the curved shape will be described.

As described above, the angular distribution of the reflected light can be changed by the curvature of the reflecting surface 2c. When the short optical member is used as in Embodiment 1, since a small component is reflected and a large angular change is required, a curved surface with high curvature needs to be used. In contrast, if a long optical member is used, a large component is applied to the reflecting surface and a large angular change is not required, so that a desired light distribution characteristic can be provided by setting low curvature to adjust the angular distribution.

In addition, the reflecting surface 2c is formed to totally reflect the luminous flux from the incident surface 2a toward the emergent surface 2b. The reflecting surface 2c may be formed as a surface subjected to metal evaporation with high reflectance through evaporation processing or the like to reflect the luminous flux from the incident surface 2a.

When the reflecting surface 2c is formed as a total reflecting surface, however, no evaporation processing or the like needs to be performed, and thus the number of manufacturing steps of the optical member 2 can be reduced to lower the manufacturing cost of the optical member 2. In addition, from the viewpoint of optical characteristics, the use of the total reflection allows the reflectance of 100% in theory (near 100% in practice), so that an effective illumination optical system can be formed with less loss of light quantity.

It is also contemplated that an illumination unit is formed by using a member having a surface corresponding to the emergent surface 2b and a member having a surface corresponding to the reflecting surface 2c. In this case, however, the number of the members constituting the illumination unit is increased and the respective members must be arranged accurately at positions where they satisfy predetermined optical characteristics.

As described above, the shapes of the incident surface 2a, the emergent surface 2b, and the reflecting surface 2c are rotationally symmetric with respect to the irradiation optical axis L. This can achieve light irradiation within a range of a substantially uniform diameter around the irradiation optical axis L.

Three holding portions 2d are formed on the side of the optical member 2 as shown in FIG. 3. The holding portions 2d are provided at substantially regular intervals around the irradiation optical axis L. The holding portions 2d are fixed to the exterior member 4 as shown in FIG. 1.

The illumination unit of the structure described above is disposed inside the video camera body 11.

Next, the light distribution characteristic of the illumination unit of Embodiment 1 will be described with reference to FIGS. 4A to 4I, FIGS. 5A to 5G, and FIG. 7.

In Embodiment 1, the light distribution characteristic of the illumination unit is estimated on the assumption that the LED 1 as the light source is a perfectly diffusing light source which irradiates light with uniform luminance over the entire area of the light-emitting surface 1a. For the LED 1 described above, its light distribution characteristic can be determined relatively easily by reversely tracing light rays from a particular position on the side of light irradiation (outside the illumination unit) to the LED 1 to count the number of the light rays reaching the LED 1. FIGS. 4A to 4I show the results two-dimensionally.

FIGS. 4A to 4I show the traces of the light rays incident on the emergent surface 2b of the optical member 2 from the outside of the illumination unit. FIGS. 4A to 4I show the traces of the light rays when the angle of the light rays before the incidence on the emergent surface 2b with respect to the irradiation optical axis L is changed in increments of 5 degrees in the range from zero degrees (in parallel with the irradiation optical axis L) to 40 degrees. FIGS. 4A to 4I show only the light rays reaching the light-emitting surface 1a of the LED 1.

Figure 4A:
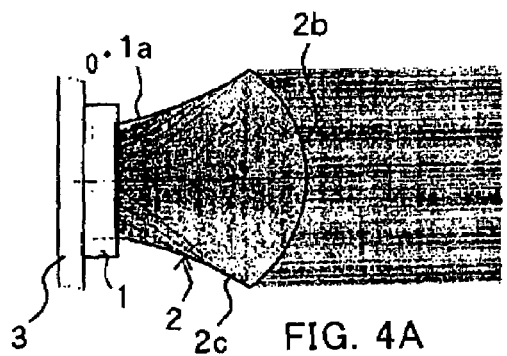
FIGS. 4A to 4I are diagrams for explaining the light distribution characteristic of the illumination unit of Embodiment 1.
Figure 4E:
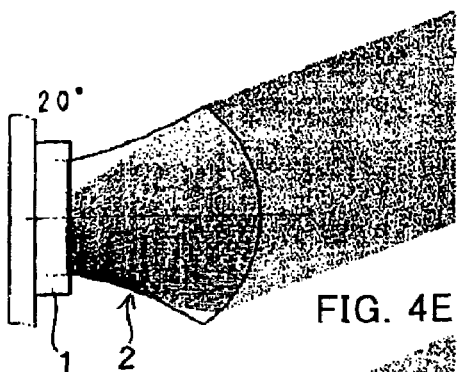

As shown in FIG. 4A, when the angle of the light rays with respect to the irradiation optical axis L is zero degrees, it can be seen that many light rays are incident on substantially the entire emergent surface 2b, refracted by the emergent surface 2b, and reach the light-emitting surface 1a of the LED 1. When the state shown in FIG. 4A is observed from the side of light irradiation (the right side in FIG. 4A), the optical member 2 can be observed to be bright over the entire lens aperture (the entire emergent surface 2b). In the state of FIG. 4A, the reflecting surface 2c of the optical member 2 exerts almost no effect.

Figure 4B:
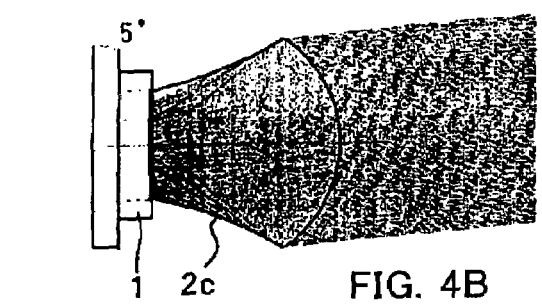
Figure 4F:
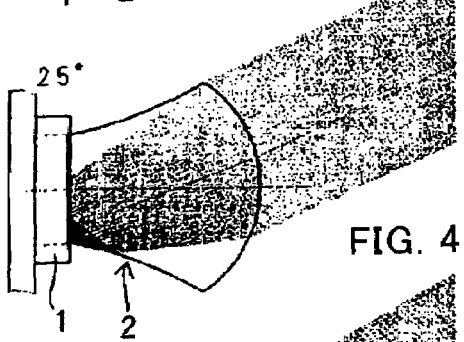

Next, FIG. 4B shows the state when the light rays incident on the emergent surface 2b are inclined 5 degrees with respect to the irradiation optical axis L. At this point, the luminous flux is incident on substantially the entire emergent surface 2b, which is changed little from the state shown in FIG. 4A. In other words, when the optical member 2 is seen from the side of light irradiation while the LED 1 is emitting light, the emergent surface 2b can be observed to be bright over the entire area.

The state of FIG. 4B differs from the state of FIG. 4A in that part of the luminous flux is reflected by part of the reflecting surface 2c (the lower area in FIG. 4B) to reach the light-emitting surface 1a.

Figure 4C:
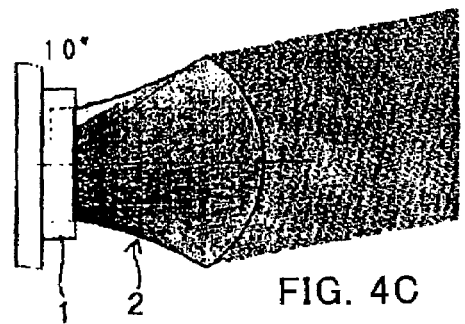
Figure 4G:
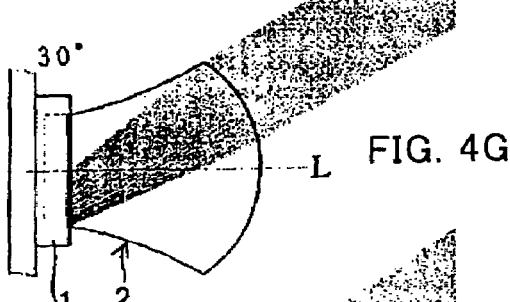
Figure 4D:
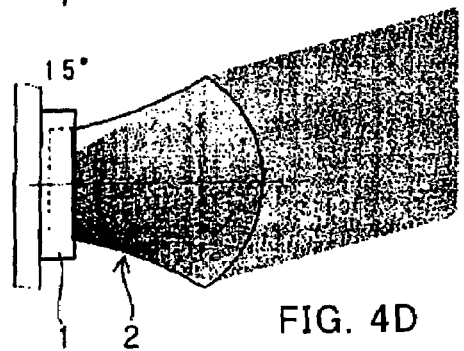
Figure 4H:
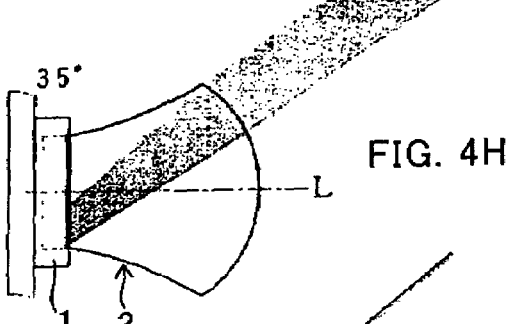
Figure 4I:
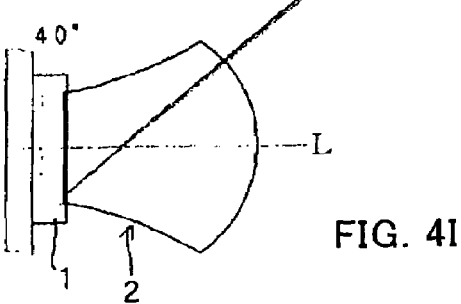

When the angle of the light rays incident on the emergent surface 2b is changed to 10 degrees and 15 degrees with respect to the irradiation optical axis L, the illumination unit takes the same state as that shown in FIG. 4B (see FIG. 4C and FIG. 4D). Specifically, one can observe that the luminous flux from the side of light irradiation is incident on substantially the entire emergent surface 2b and the entire emergent surface 2b is bright. Part of the luminous flux from the emergent surface 2b is reflected by the reflecting surface 2c and reaches the light-emitting surface 1a.

As the transition moves from the state of FIG. 4A to FIG. 4D, however, a smaller and smaller component directly reaches the light-emitting surface 1a from the emergent surface 2b, and a larger and larger component reaches the light-emitting surface 1a through the reflecting surface 2c.

When the angle of the light rays incident on the emergent surface 2b is 20 degrees or more with respect to the irradiation optical axis L, the amount of the component directly reaching the light-emitting surface 1a from the emergent surface 2b continues to decrease gradually as shown in FIGS. 4E to 4I. The amount of the component reflected by the reflecting surface 2c and reaching the light-emitting surface 1a increases until the state of FIG. 4D but gradually decreases after the state of FIG. 4D. In addition, as the angle of the light rays with respect to the irradiation optical axis L is increased, the area of the emergent surface 2b on which the luminous flux is incident from the light irradiation side gradually reduces as shown in FIGS. 4A to 4I.

In this manner, the illumination unit (the optical member 2) of Embodiment 1 is characterized in that the ratio between the light refracted by the emergent surface 2b having the positive refractive power and the light reflected by the reflecting surface 2c of the optical member 2 is continuously changed to ensure that the entire emergent surface 2b is bright in a larger angular area than the conventional illumination units.

Next, description will be made of a light distribution characteristic provided when a condenser lens for use in a conventional illumination unit is used under substantially the same conditions as those in Embodiment 1 with reference to FIGS. 5A to 5G. FIGS. 5A to 5G show the traces of light rays incident on a condenser lens from the outside of the illumination unit and show only the light rays reaching a light-emitting surface of an LED. The angle of the light rays incident on the condenser lens is changed in increments of 5 degrees starting with zero degrees with respect to an irradiation optical axis L, similarly to FIGS. 4A to 4I.

FIGS. 5A to 5G show the state (defocus state) in which the LED is located at a distance from a condenser lens 22 shorter than the focus lens of the condenser lens 22.

Figure 5A:
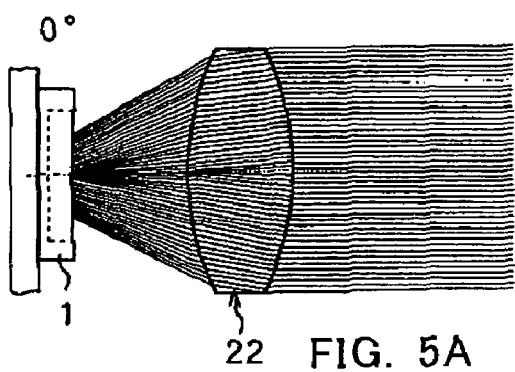
FIGS. 5A to 5G are diagrams for explaining the light distribution characteristic of a conventional condenser lens used for Embodiment 1.
Figure 5B:
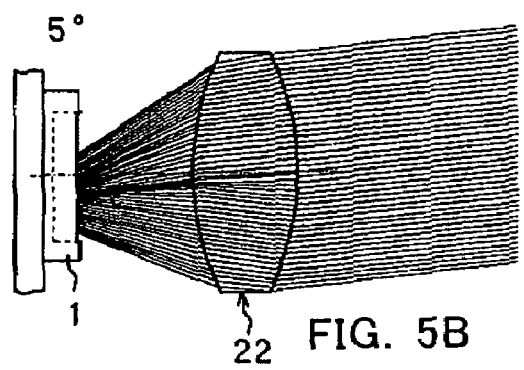
Figure 5C:
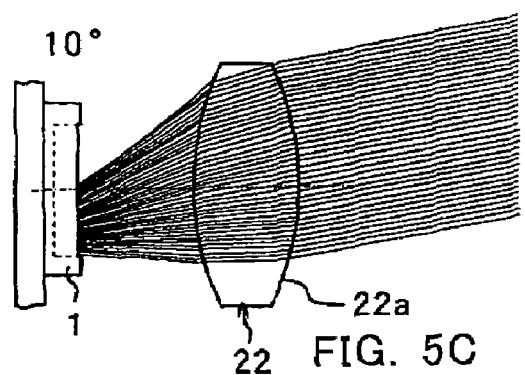
Figure 5D:
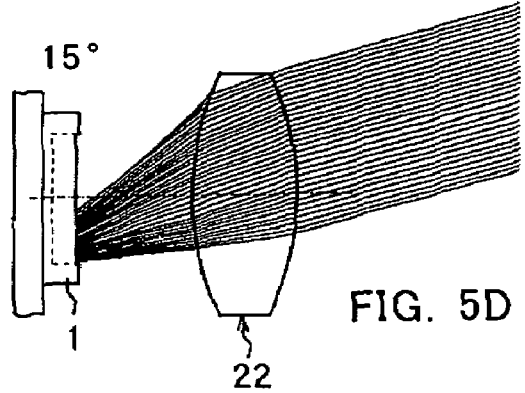
Figure 5E:
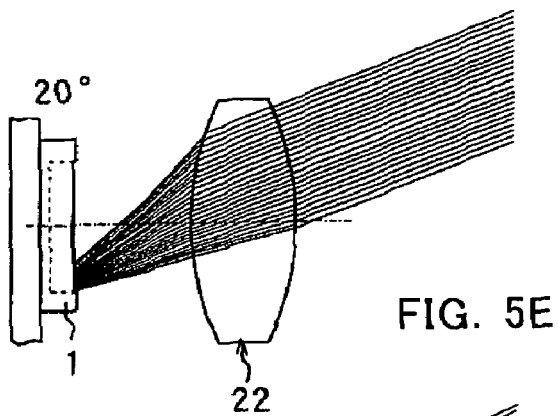
Figure 5F:
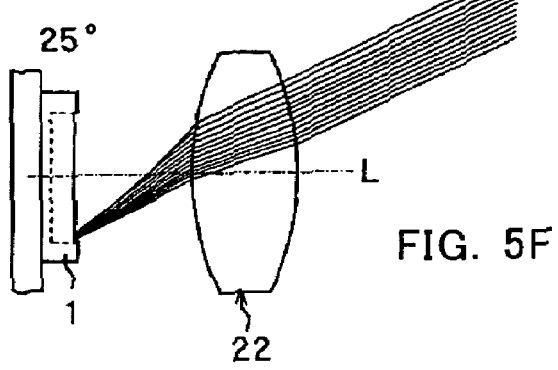

Almost all of a convex lens surface 22a of the condenser lens 22 can be bright from the state in which luminous flux in parallel with the irradiation optical axis L is incident (FIG. 5A) to the state in which luminous flux inclined 5 degrees with respect to the irradiation optical axis L is incident (FIG. 5B). However, when luminous flux inclined larger than 5 degrees with respect to the irradiation optical axis L is incident, the area of the convex lens surface 22a of the condenser lens 22 which receives the luminous flux from the light irradiation side gradually reduces as shown in FIGS. 5C to 5F.

Figure 5G:
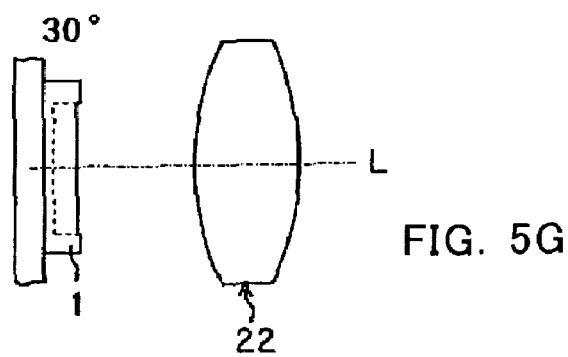

When luminous flux inclined 30 degrees with respect to the irradiation optical axis L is incident, no light ray passes through the condenser lens 22 to reach the light-emitting surface 1a as shown in FIG. 5G.

In this manner, the light irradiation area in the conventional illumination unit which uses the condenser lens 22 (with the maximum irradiation angle smaller than 30 degrees) is smaller than the light irradiation area in the illumination unit of Embodiment 1 (with the maximum irradiation angle equal to 40 degrees, see FIGS. 4A to 4I).

As a result, in the conventional optical system which includes the condenser lens 22 having two convex lens surfaces in front of the LED 1 (on the side of light irradiation) for condensing light, bright illumination is possible in the particular angular range including the irradiation optical axis L. In a wider range than the particular angular range, however, extremely dark illumination is provided and the irradiation range is considerably smaller than that in Embodiment 1.

FIGS. 5A to 5G show the illumination unit used in the state (defocus state) in which the refractive power of the condenser lens 22 is set to a low level.

It is contemplated that a condenser lens formed to have a higher refractive power than that shown in FIGS. 5A to 5G could be used to irradiate more luminous flux to a required irradiation area. However, increasing the refractive power of the lens does not necessarily result in an optical system with a higher condensing ability. Specifically, while the increased refractive power of the condenser lens can condense to some extent luminous flux having a component at a smaller angle with respect to the irradiation optical axis, luminous flux having a component at a larger angle with respect to the irradiation optical axis lead to an increase in unnecessary luminous flux subjected to total reflection inside the lens. Consequently, an efficient condenser optical system is not always achieved.

Next, FIG. 7 shows a graph of the light distribution characteristics of the respective illumination units shown in FIGS. 4A to 4I and FIGS. 5A to 5G. In FIG. 7, latitudes of the circular graph represent the value (ratio) of light quantity when the light quantity on the irradiation optical axis is defined as 100% (1.0), while longitudes represent the angle with respect to the irradiation optical axis.

In FIG. 7, a solid line represents the light distribution characteristic of the illumination unit in Embodiment 1, while a broken line represents the light distribution characteristic of the illumination unit (the structure shown in FIGS. 5A to 5G) when the optical member 2 of Embodiment 1 is replaced with the conventional condenser lens.

As apparent from FIG. 7, the illumination unit of Embodiment 1 can perform uniform irradiation in a wider range. Specifically, the light quantity of luminous flux in the angular range of up to approximately 20 degrees with respect to the irradiation optical axis is substantially equal to the light quantity on the irradiation optical axis. The light quantity of luminous flux at 30 degrees with respect to the irradiation optical axis corresponds to 50% (0.5) of the light quantity on the irradiation optical axis.

On the other hand, for the illumination unit using the condenser lens, luminous flux close to the irradiation optical axis (luminous flux in the range from zero to five degrees) has substantially equal light quantity to allow relatively bright irradiation. However, in the range of angles of five degrees or more with respect to the irradiation optical axis, the light quantity decreases and a desirable light distribution characteristic is not necessarily provided.

According to Embodiment 1, it is necessary only to provide the optical member 2 disposed on the light irradiation side of the LED 1 with the aforementioned surfaces (the incident surface 2a, the emergent surface 2b, and the reflecting surface 2c), while it is unnecessary to dispose a plurality of optical members for efficiently condensing luminous flux emerging from the LED 1. This can prevent an increase in size and cost of the illumination unit due to an increased number of optical members.

Embodiment 2

FIGS. 8 to 14 are diagrams for explaining an illumination unit which is Embodiment 2 of the present invention. The illumination unit of Embodiment 2 employs an LED unit which has a plurality of LED elements emitting different colors arranged in a single package.

Figure 8:
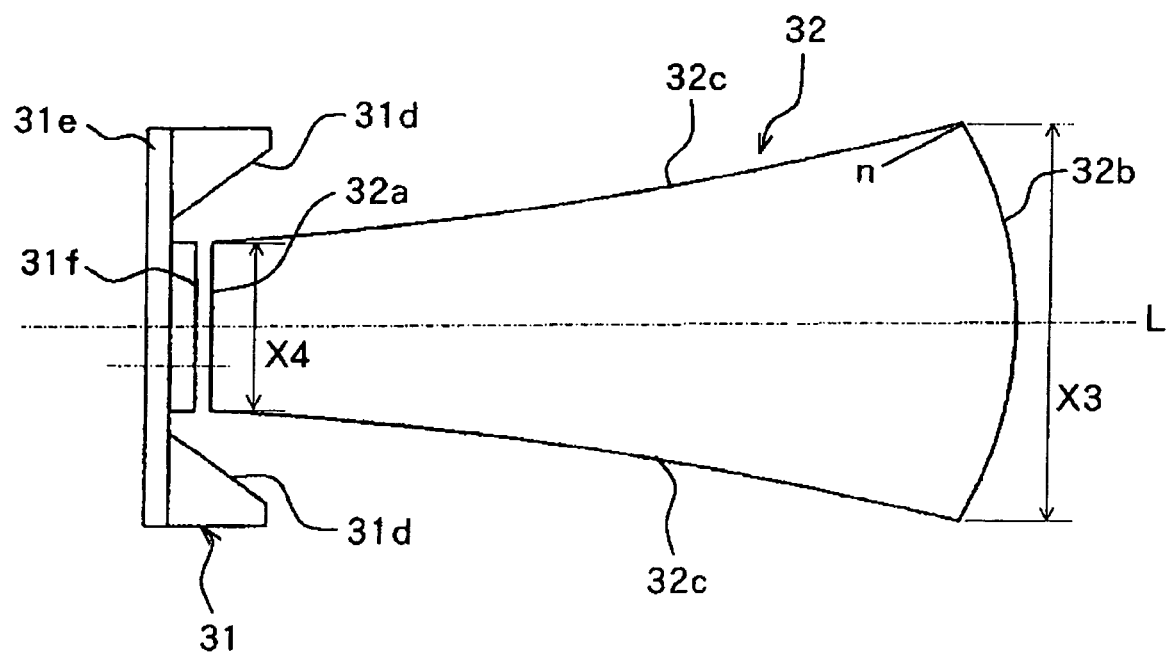
FIG. 8 is a longitudinal section view showing the structure of an illumination unit which is Embodiment 2 of the present invention.
Figure 9:
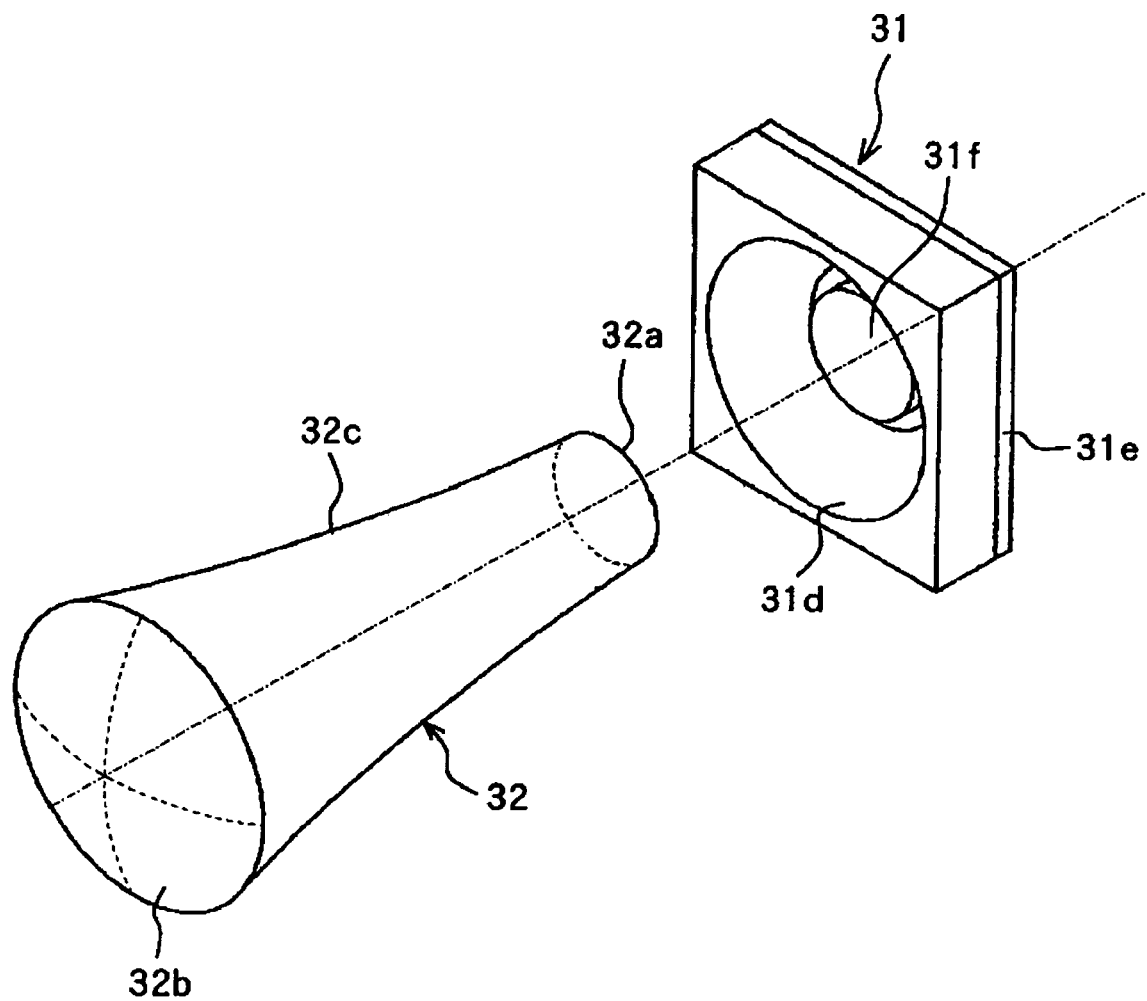
FIG. 9 is a perspective view showing the outer appearance of the illumination unit of Embodiment 2.
Figure 10:
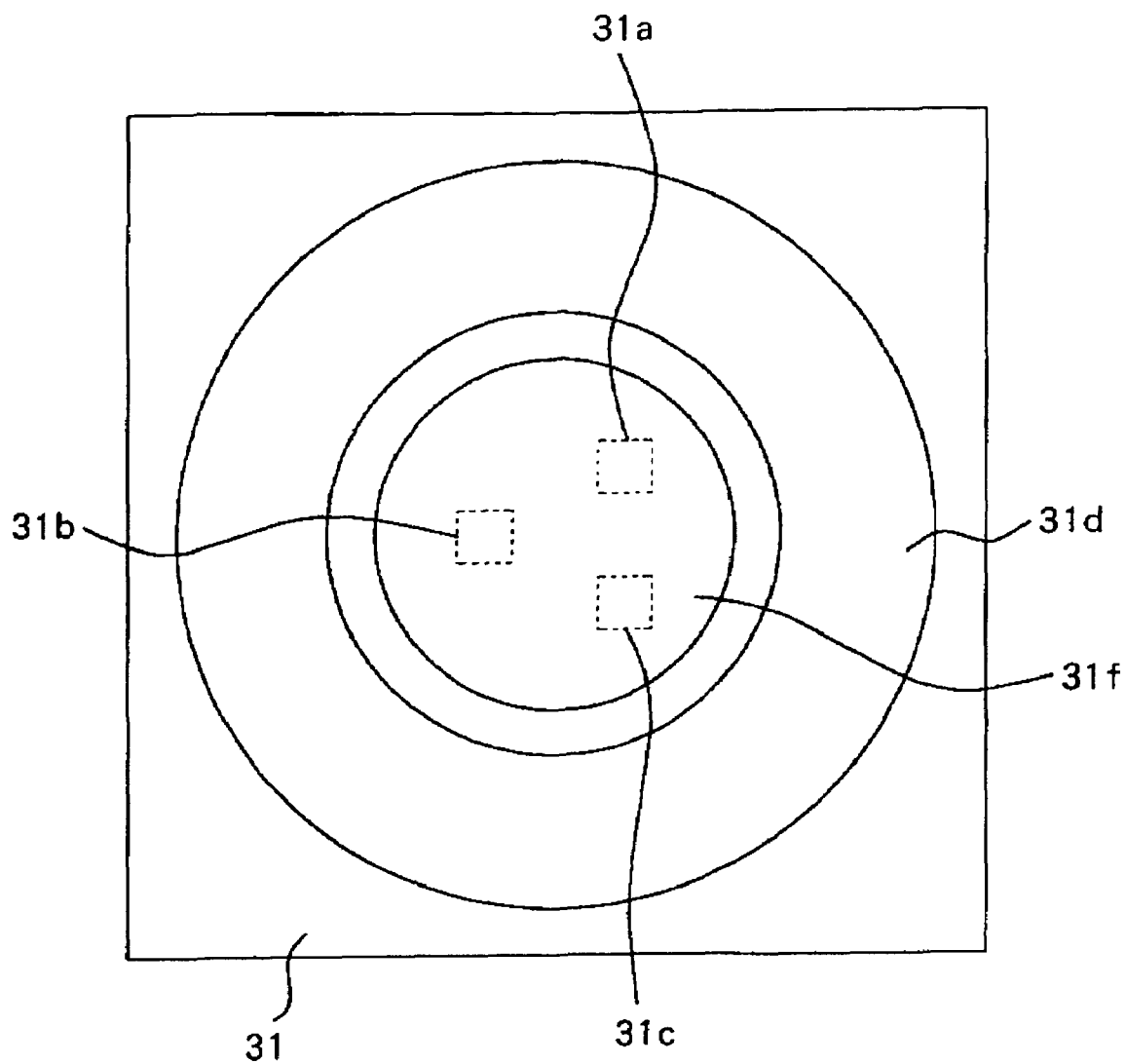
FIG. 10 is a front view showing an LED unit in Embodiment 2.

FIG. 8 is a longitudinal section view showing the structure of the illumination unit of Embodiment 2. FIG. 9 is a perspective view showing the outer appearance of the structure of the illumination unit of Embodiment 2. FIG. 10 is a front view showing the LED unit for use in Embodiment 2.

Figure 11:
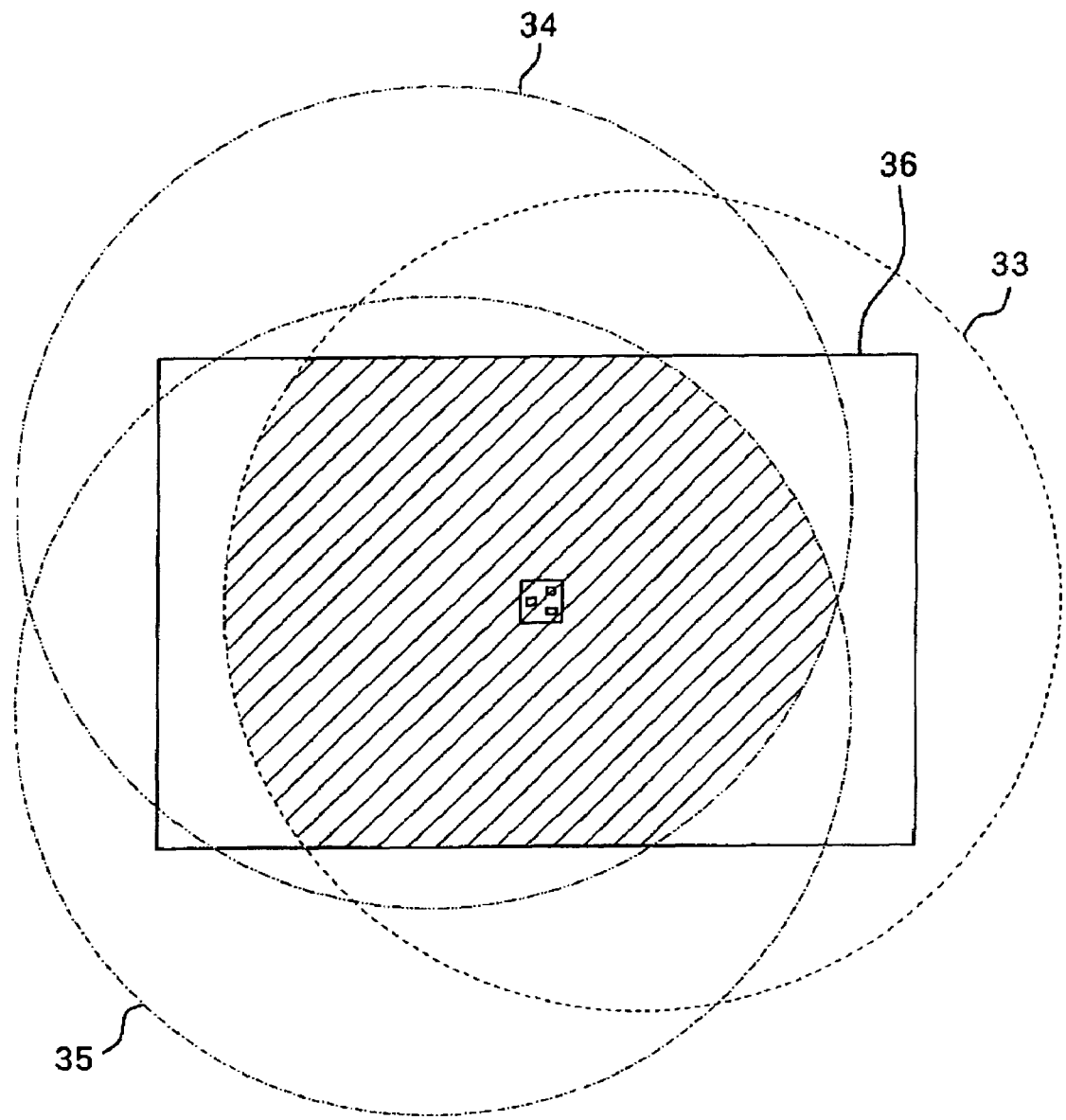
FIG. 11 is a schematic diagram for explaining the light distribution characteristic of each LED in the abovementioned LED unit.

FIG. 11 shows the distribution of the irradiation ranges of the respective LED elements relative to a required irradiation range when a condenser lens (the condenser lens 22 shown in FIGS. 5A to 5G) is disposed for condensing in front of the LED unit shown in FIG. 10 (on the side of light emergence).

Figure 12:
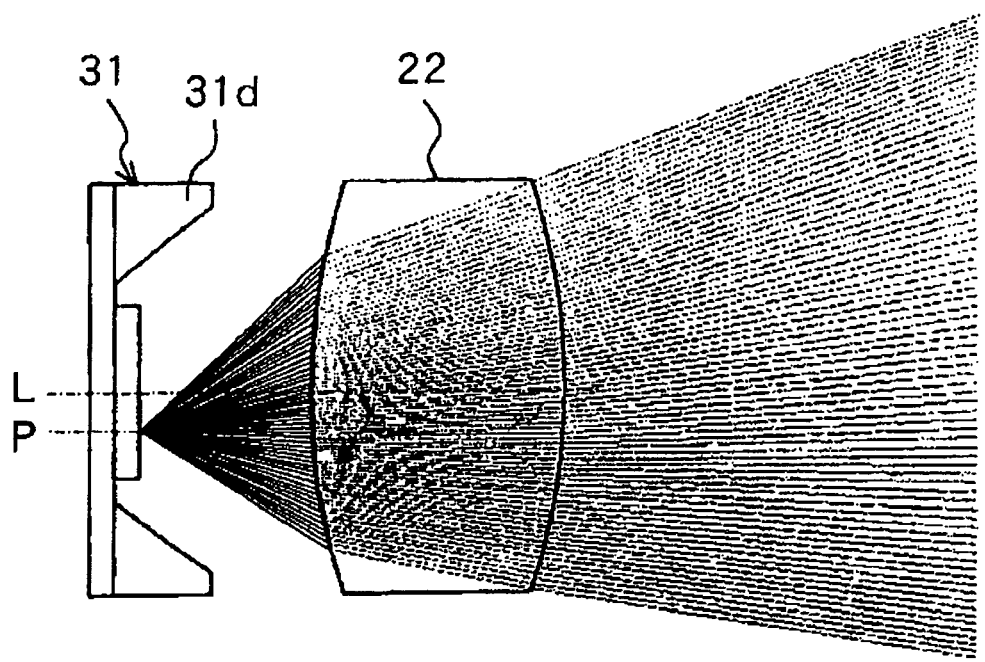
FIG. 12 is a diagram for explaining the light distribution characteristic of a conventional condenser lens used for Embodiment 2.
Figure 13:
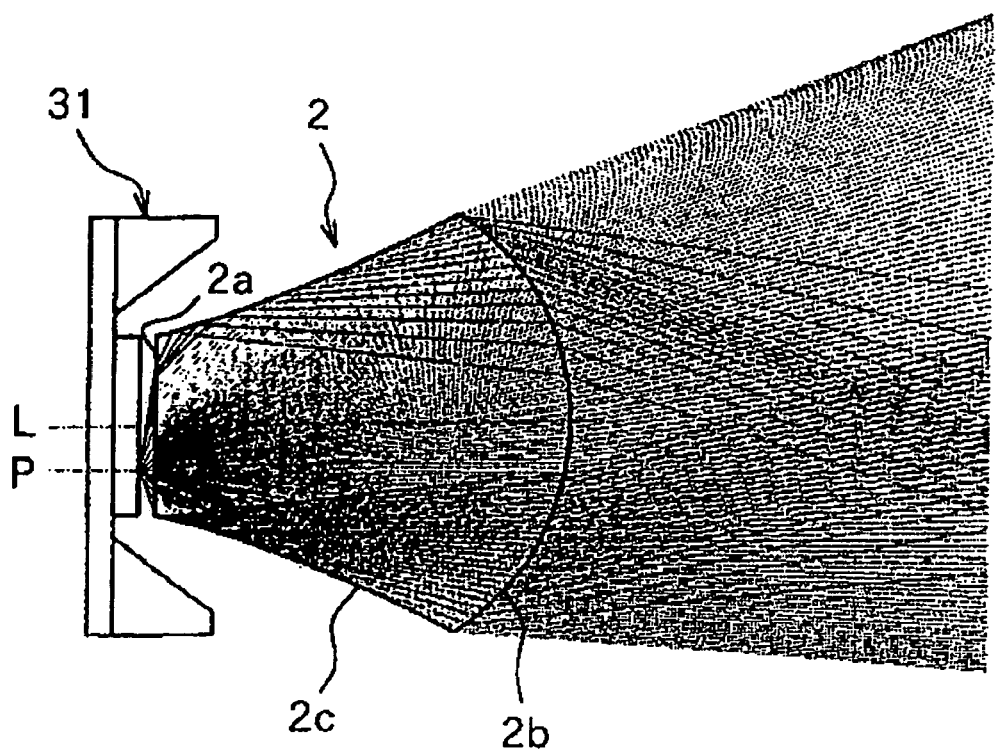
FIG. 13 is a diagram for explaining the light distribution characteristic of the optical member of Embodiment 1 for Embodiment 2.
Figure 14:
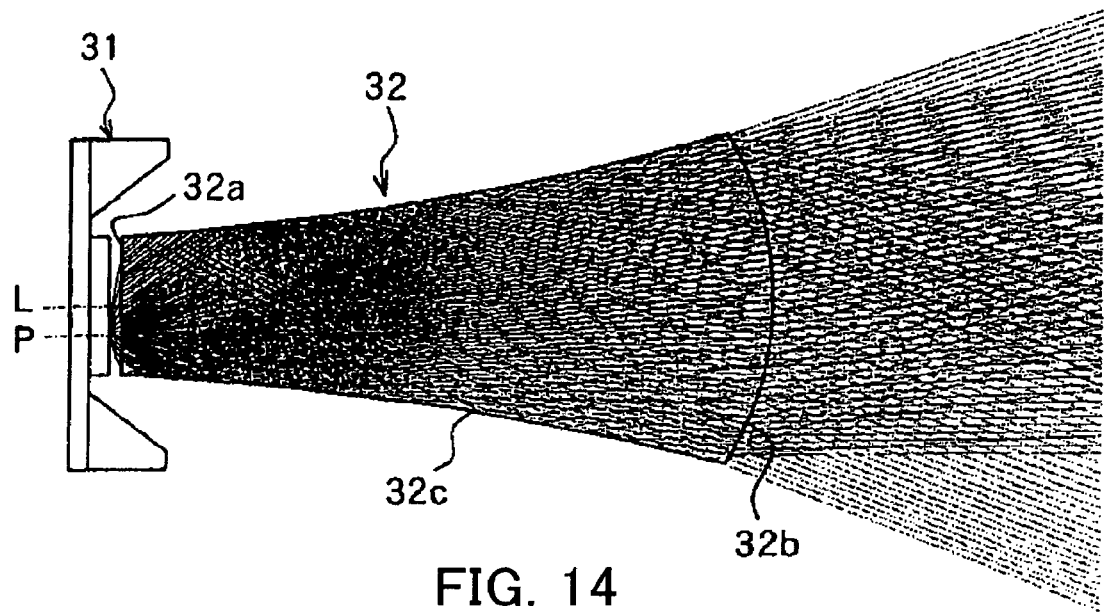
FIG. 14 is a diagram for explaining the light distribution characteristic of the illumination unit of Embodiment 2.

FIGS. 12 to 14 are diagrams for explaining how luminous flux emerging from one LED in the LED unit is condensed by each condensing optical system. FIGS. 12 to 14 also show light ray traces of the luminous flux emerging from the LED. Specifically, FIG. 12 shows the use of the condense lens 22 having two convex lens surfaces. FIG. 13 shows the use of the optical member 2 described in Embodiment 1. FIG. 14 shows the use of an optical member 32 in Embodiment 2.

The LED unit, which has been used recently for illumination in mobile phones and the like and enables illumination with a plurality of different colors, typically has three LEDs for different colors mounted on a single LED package.

The LED unit is formed such that it can provide white color by lighting the three LEDs simultaneously and various colors by using a combination of arbitrary ones of the LEDs. The respective LEDs are disposed at slightly different positions in the package, and when luminous flux emerging from each of the LEDs at the different positions is condensed by a single condenser lens, uneven color may be typically found in illumination light. In addition, light distribution may include uneven brightness in some sites to be irradiated.

Embodiment 2 proposes the illumination unit which can prevent uneven color and uneven light distribution to provide uniform illumination when the LED unit including the factor for variations in light is used as described above.

Prior to the description of the specific structure of the illumination unit of Embodiment 2, the structure of the aforementioned LED unit will be simply described with reference to FIG. 10. FIG. 10 is a front view of the LED unit which has the LED chips for three colors, that is, red, green, and blue, arranged in the single package.

As shown in FIG. 10, the respective LED elements 31*a*, 31*b*, and 31*c* cannot be disposed at the same position for convenience of mounting and are arranged with an equal distance between them. A reflecting portion 31*d* is formed around the LED elements 31*a*, 31*b*, and 31*c*.

The reflecting portion 31*d* has a certain light-condensing function, but provides a small light-condensing effect in the whole LED unit. Thus, when the LED unit shown in FIG. 10 is actually used, a light-condensing member needs to be disposed in front of the LED unit (on the side of light irradiation). In many of conventional illumination units, the condenser lens 22 as shown in FIG. 12 is disposed in front of the LED unit to condense luminous flux emerging from the respective LED elements.

When the single condenser lens is used to condense luminous flux emerging from each of the LED elements, however, the slightly different positions of the respective LED elements may cause mismatched irradiation areas as shown in FIG. 11 to produce uneven color in part of a required irradiation area even when the condenser lens is used to condense light.

In FIG. 11, the irradiation areas of the respective LED elements for the three colors are represented by a broken line 33, a chain double dashed line 34, and a dashed line 35, and the required irradiation area is represented by a solid line 36. As shown in FIG. 11, in an area other than a shaded area of the required irradiation area 36, all of the irradiation areas 33, 34, and 35 of the LED elements do not overlap and uneven color may be found.

Embodiment 2 has been described of the LED unit which has the three (three color) LED elements provided in the single package. Alternatively, when all of the three LEDs have the same color, the required irradiation range may include areas with different levels of brightness, that is, an area in which all of the irradiation areas of the LED elements do not overlap, to cause uneven light distribution. In addition, when a plurality of LED elements emitting different colors are used, the required irradiation range may include areas with different levels of brightness to cause uneven light distribution similarly to the aforementioned case.

Next, detailed description will be made of the structure of the illumination unit of Embodiment 2 when the aforementioned LED unit is used. The illumination unit of Embodiment 2 is provided inside the video camera shown in FIG. 6, similarly to Embodiment 1.

In FIG. 8 and the like, reference numeral 31 shows the LED unit which has the plurality of (three) LED elements arranged in the single package. The LED unit 31 can emit fixed light for a certain time period. The LED unit 31 is assumed to be a light source for emitting non-uniform luminous flux which causes uneven color, uneven brightness and the like. The illumination unit of Embodiment 2 can convert the uneven luminous flux emerging from the aforementioned light source into even luminous flux and can perform the conversion efficiently. Specifically, the optical system (optical member) for use in Embodiment 2 needs not only to simply condense light efficiently as described in Embodiment 1 but also to allow various types of unevenness to be eliminated simultaneously.

The basic structure of the illumination unit of Embodiment 2 will be described with reference to FIG. 8 and the like.

In FIG. 8 and the like, the reflecting portion 31*d* is formed in the LED unit 31 which contains the three LED chips 31*a*, 31*b*, and 31*c*. In Embodiment 2, however, the reflecting portion 31*d* is not utilized, that is, an existing product is used as the LED unit 31.

Reference numeral 31*e* shows a hard substrate formed at the back of the LED unit 31. The respective LED elements are electrically and mechanically connected to the hard substrate 31*e* through wire bonding, soldering or the like. The hard substrate 31*e* is fixed to the video camera body 11 by a fixing member, not shown, to be located at a position where the most efficient function is achieved as the illumination optical system.

The optical member 32 is a member for condensing luminous flux emerging from the LED unit 31 and is formed of a highly transparent (rate of attenuation almost equal to zero) resin material.

An incident surface 32*a* of the optical member 32 has a generally circular outer shape when viewed from the side of the LED unit 31 and is formed of a surface generally orthogonal to an irradiation optical axis L. The size (diameter) of the incident surface 32*a* is generally equal to the size (diameter) of a surface 31*f* (light-emitting surface) of the LED unit 31 on which the LED elements are disposed. The optical member 32 is arranged relative to the LED unit 31 such that the incident surface 32*a* is disposed immediately before the light-emitting surface of the LED unit 31 and is opposed to the light-emitting surface on the irradiation optical axis L.

On the other hand, an emergent surface 32*b* of the optical member 32 is formed of a lens surface that has a positive refractive power (a positive optical power) as shown. Part of luminous flux emerging from the LED unit 31 and incident on the incident surface 32*a* is directly sent toward the emergent surface 32*b* and then is condensed by refraction at the emergent surface 32*b*.

The aperture of the emergent surface 32*b* is larger than the aperture of the incident surface 32*a* when the optical member 32 is viewed from the irradiation optical axis L. Specifically, as shown in FIG. 8, a diameter x3 of the emergent surface 32*b* is larger than a diameter x4 of the incident surface 32*a*.

A reflecting surface 32*c* of the optical member 32 reflects the remainder of the luminous flux emerging from the LED 31 and incident on the incident surface 32*a*, and guides it to the emergent surface 32*b*. The reflecting surface 32*c* has one end in contact with the incident surface 32*a* and the other end in contact with the emergent surface 32*b*. The reflecting surface 32*c* is formed as a curved surface. Specifically, the shape of the reflecting surface 32*c* is formed such that the area (diameter) of the cross section of the optical member 32 along a plane orthogonal to the irradiation optical axis L continuously increases toward the emergent surface 32b from the incident surface 32a, similarly to the optical member 2 described in Embodiment 1.

At least part of the reflecting surface 32c closer to the emergent surface 32b(or it may be the entire reflecting surface 32c) is formed further away from the irradiation optical axis L than a normal n to the emergent surface 32b at the end of the emergent surface 32b (the boundary between the emergent surface 32b and the reflecting surface 32c) as shown in FIG. 8. Specifically, in a plane orthogonal to the irradiation optical axis L, the distance from the irradiation optical axis L to the reflecting surface 32c is larger than the distance from the irradiation optical axis L to the normal n.

In addition, the reflecting surface 32c is preferably formed of a total reflection surface as described in Embodiment 1. This allows the reflecting surface to be formed without processing such as evaporation, so that the optical member 32 can be easily manufactured at low cost. In addition, for optical characteristics, the use of the total reflection can provide the reflectance of 100% in theory to form the optical system with less loss of light quantity and high condensing efficiency.

Similarly to Embodiment 1, the shapes of the incident surface 32a, the emergent surface 32b, and the reflecting surface 32c are rotationally symmetric with respect to the irradiation optical axis L. This can achieve light irradiation within a range of a substantially uniform diameter around the irradiation optical axis L.

The optical member 32 is fixed to an exterior member of the video camera body 11 through a holding portion, not shown.

The structure of the illumination unit in Embodiment 2 differs from that of the illumination unit of Embodiment 1 in that the length of the optical member 32 along the irradiation optical axis L is larger than the length of the optical member 2 of Embodiment 1 along the irradiation optical axis L. Specifically, the area of the reflecting surface 32c is larger than the area of the reflecting surface 2c. The sizes (diameters) of the incident surface 32a and the emergent surface 32b of the optical member are substantially the same as the sizes (diameters) of the incident surface 2a and the emergent surface 2b of the optical member 2 of Embodiment 1.

Next, description will be made of how luminous flux emerging from the LED 31 travels with reference to FIGS. 12 to 14. FIG. 14 shows the use of the illumination unit of Embodiment 2. To clarify the characteristics of Embodiment 2, FIG. 12 shows the use of the conventional condenser lens (having convex lens surfaces as an incident surface and an emergent surface) and FIG. 13 shows the use of the optical member for use in Embodiment 1 instead of the optical member 32 for use in Embodiment 2.

FIGS. 12 to 14 show the traces of representative light rays emerging from the LED element disposed at a position shifted from the irradiation optical axis L, that is, a position P below the irradiation optical axis L.

First, FIG. 12 shows the structure of the illumination unit when the conventional condenser lens is used, in which luminous flux emerging from the LED element is condensed by the condenser lens having convex surfaces on both sides.

As shown in FIG. 12, the luminous flux emerging from the LED element at the position shifted from the irradiation optical axis L is converted by the condenser lens 22 into irradiation luminous flux which has the upward center of luminous flux. In other words, the angular range of the irradiation luminous flux transmitted through the condenser lens 22 lower than the irradiation optical axis L is smaller than the angular range higher than the irradiation optical axis L.

Although not shown, the other LED elements are not disposed on the irradiation optical axis L either. When luminous flux emerging from the each of other LED elements is viewed from a direction different from that shown in FIG. 12, it shows the same traces as those of the luminous flux shown in FIG. 12 (this also applies to the cases shown in FIGS. 13 and 14). The light distribution obtained by combining each luminous flux emerging from the three LED elements is shown in FIG. 11.

Next, description will be made of the use of the optical member 2 described in Embodiment 1. Luminous flux emerging from the LED element at the position P is converted by the optical member 2 into irradiation luminous flux which is irradiated upward relative to the irradiation optical axis L. In other words, the angular range of the irradiation luminous flux transmitted through the optical member 2 lower than the irradiation optical axis L is smaller than the angular range higher than the irradiation optical axis L.

The optical member 2 shown in FIG. 13 has the reflecting surface 2c formed therein, and part of the luminous flux incident from the incident surface 2a is reflected by the reflecting surface 2a and guided to the emergent surface 2b. The component reflected by the upper area of the reflecting surface 2c of the optical member 2 emerges from the emergent surface 2b and travels downward relative to the irradiation optical axis L.

As a result, the illumination unit allows irradiation in a wider range than that of the structure shown in FIG. 12 and acts to reduce uneven light distribution. However, the aforementioned component reflected by the upper area of the reflecting surface 2c of the optical member 2 does not constitute a major part as compared with the other components. It is thus difficult to provide a substantially uniform light distribution characteristic in a vertical direction (a vertical direction in FIG. 13) of the illumination unit, that is, to provide substantially equal upper and lower angular ranges of the luminous flux emerging from the emergent surface 2b of the optical member 2 relative to the irradiation optical axis L.

However, the reflecting surface 2c provided for the optical member 2 can prevent the escape of a component from the optical member 2 to realize effective use of all the luminous flux emerging from the LED element. Thus, in the structure shown in FIG. 13, loss of light quantity can be reduced to improve the irradiation efficiency.

Next, the optical member 32 for use in the illumination unit of Embodiment 2 will be described. The greatest characteristic of the optical member 32 in Embodiment 2 is that the length along the irradiation optical axis L is larger to reflect (totally reflect) a larger component by the reflecting surface 32c as compared with the optical member 2 shown in FIG. 13.

In Embodiment 2, the length of the optical member 32 along the irradiation optical axis L is larger than that of the optical member 2, that is, the area of the reflecting surface 32c is larger than that of the optical member 2 to increase the number of reflections of part of the luminous flux incident from the incident surface 32a by the reflecting surface 32c. This can provide a uniform light distribution characteristic regardless of the position of the LED element.

As shown in FIG. 14, in Embodiment 2, the optical member 32 is used to combine the component traveling from the incident surface 32a directly to the emergent surface 32b and emerging therefrom, the component emerging from the emergent surface 32b after one reflection by the reflection surface 32a, and the component emerging from the emergent surface 32b after two reflections by the reflecting surface 32c. Thus, a more uniform light distribution characteristic can be provided in the vertical direction (vertical direction in FIG. 14) of the illumination unit as compared with the optical systems shown in FIGS. 12 and 13. In addition, the use of the reflecting surface 32c can reduce loss of light quantity to enhance the condensing effect. Therefore, the illumination unit of Embodiment 2 is excellent in optical characteristics.

It is necessary to set the length of the optical member 32 (the reflecting surface 32c) along the irradiation optical axis L such that part of the luminous flux incident from the incident surface 32a is reflected at least twice in order to produce the aforementioned effect. Part of the luminous flux incident from the incident surface 32a may be reflected by the reflecting surface 32c three times or more, but in this case, the length of the illumination unit along the irradiation optical axis L is increased (the size thereof is increased). It is thus preferable to use the structure which causes the two reflections by the reflecting surface 32c as in Embodiment 2.

While Embodiment 2 has been described of the use of the LED unit having the three LED elements disposed in the single package, the present invention is not limited to the use of the three LED elements, and the effect described in Embodiment 2 can also be achieved when an LED unit having four or more LED elements disposed in a single package is used. In addition, the effect of Embodiment 2 can also be achieved when two LED elements are disposed in a single package.

Embodiment 3

FIGS. 15 to 18 are diagrams for explaining an illumination unit which is Embodiment 3 of the present invention. The illumination unit of Embodiment 3 is optimal especially when a white-color LED obtained by combining a blue-color LED with a phosphor is used as a light source.

Figure 15:
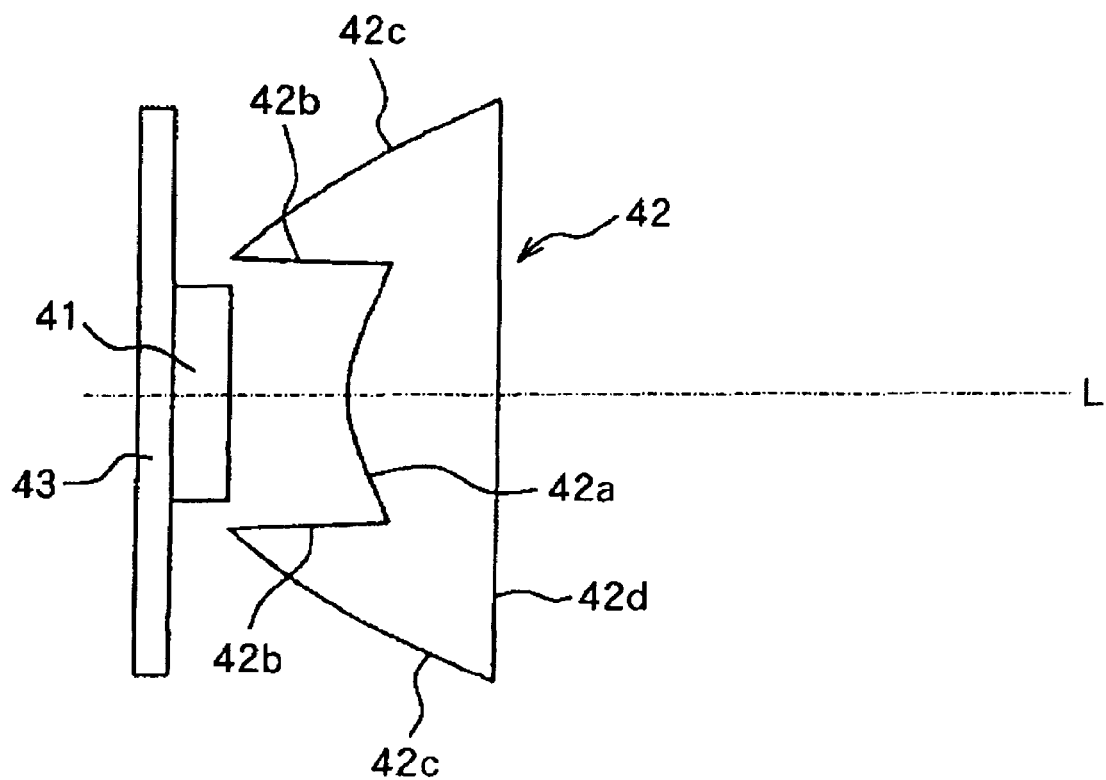
FIG. 15 is a longitudinal section view showing the structure of an illumination unit which is Embodiment 3 of the present invention.
Figure 16:
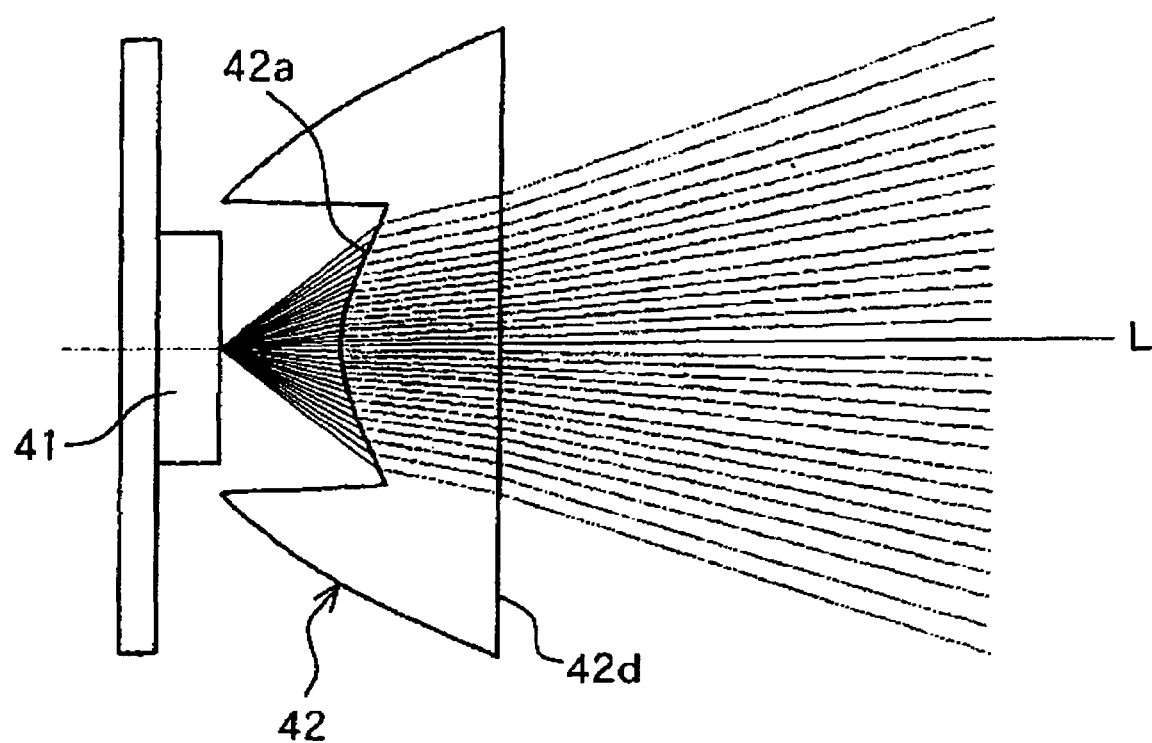
FIG. 16 shows the traces of representative light rays emerging from an LED at a particular angle in the illumination unit of Embodiment 3.
Figure 17:
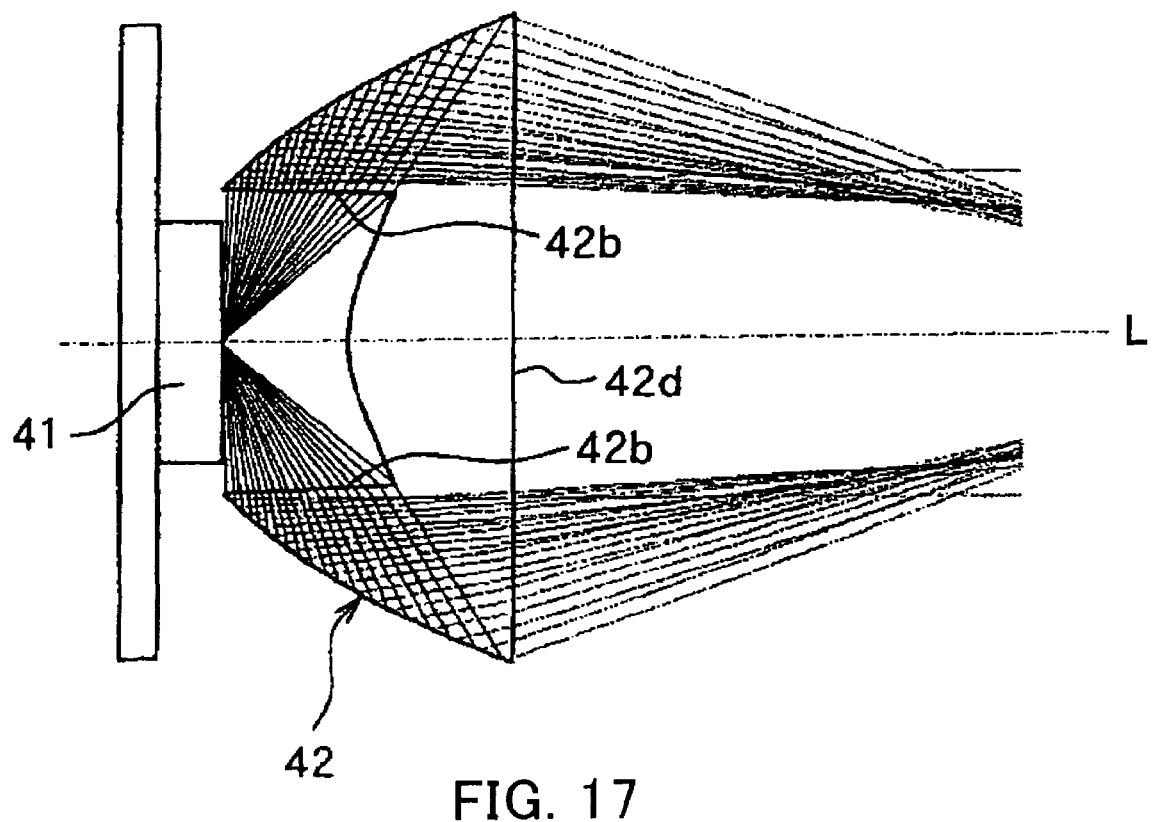
FIG. 17 shows the traces of representative light rays emerging at an angle larger than the particular angle in the illumination unit of Embodiment 3.

FIG. 15 is a longitudinal section view showing the structure of the illumination unit of Embodiment 3. FIG. 16 is provided by adding, to the longitudinal section view of FIG. 15, the light ray traces of a component at a smaller angle with respect to an irradiation optical axis of luminous flux emerging from the center of the LED. FIG. 17 is provided by adding, to the longitudinal section view, the light ray traces of a component at a larger angle with respect to the irradiation optical axis of the luminous flux emerging from the center of the LED.

Figure 18:
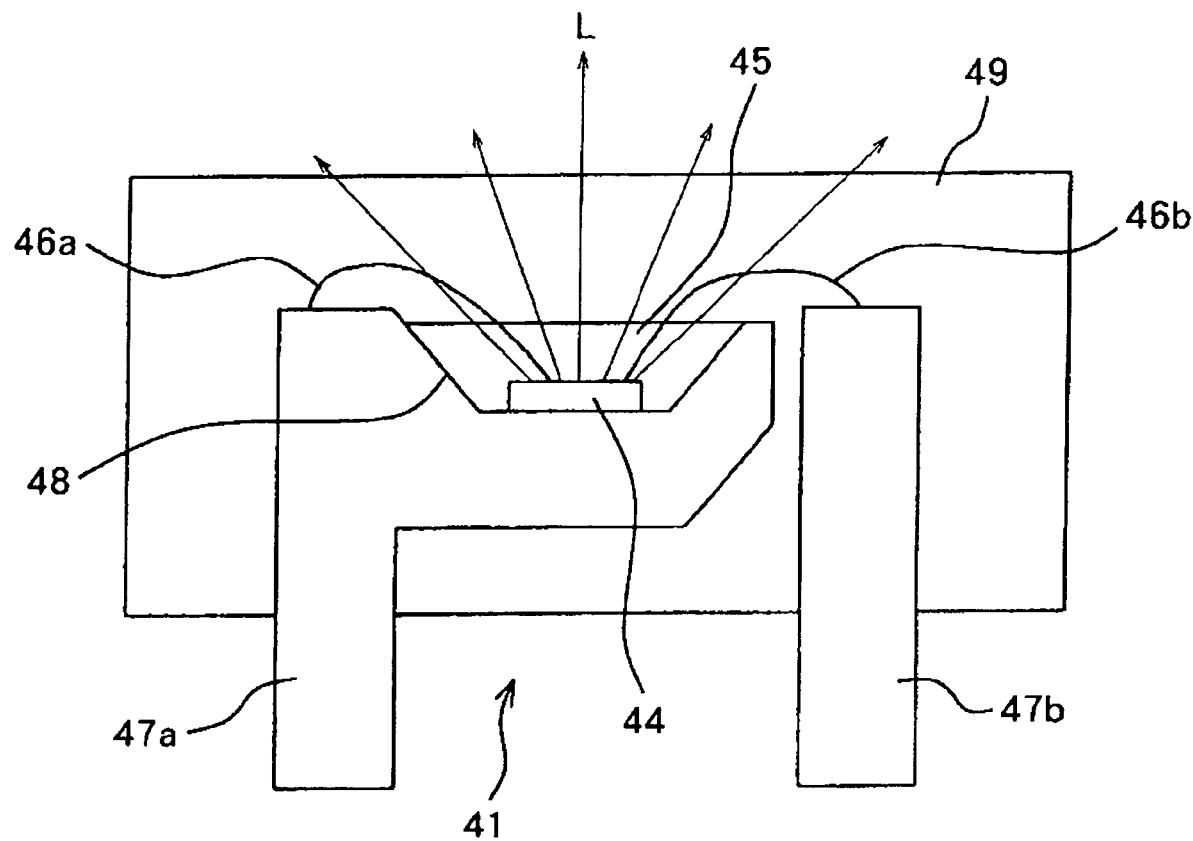
FIG. 18 is a section view for explaining the structure of a white-color LED in Embodiment 3.
Figure 19:
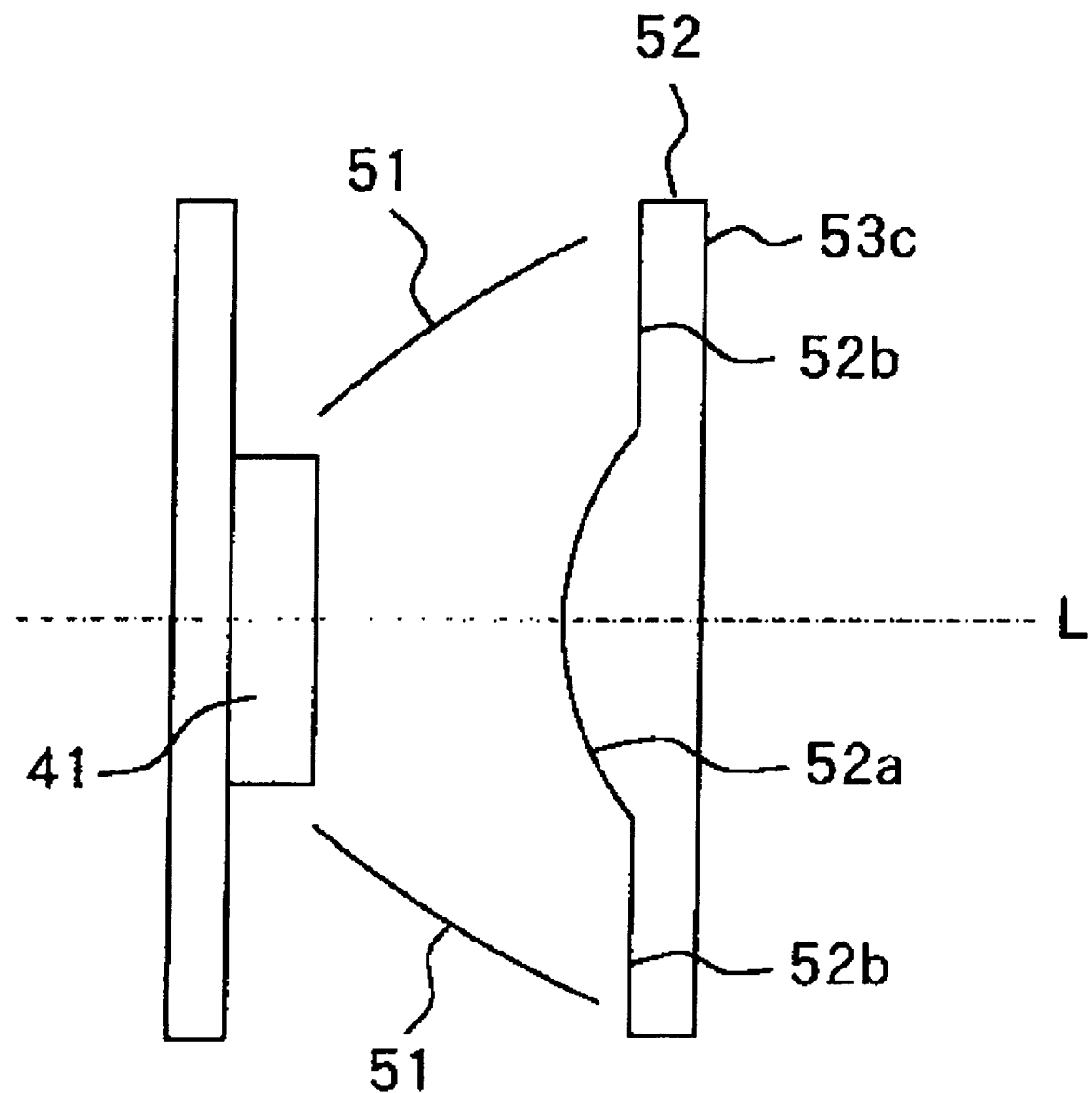
FIG. 19 is a section view showing the structure of an illumination unit which is a variation of Embodiment 3.

FIG. 18 is a section view for explaining the structure of the white-color LED. FIG. 19 is a longitudinal section view showing the structure of an illumination unit which is a variation of Embodiment 3.

First, description will be made of the challenge assumed in Embodiment 3.

Embodiment 3 intends to efficiently use luminous flux emerging from the light source and to reduce uneven color on an irradiation surface caused by the structure of the white-color LED. In the following, description will first be made of the structure of the white-color LED, the mechanism of coloring, and the factor for the occurrence of uneven color with reference to FIG. 18, and then of the structure of the illumination unit of Embodiment 3 capable of reducing the occurrence of uneven color.

In FIG. 18, reference numeral 44 shows the blue-color LED chip, and reference numeral 45 shows a phosphor layer formed by applying a YAG (yttrium aluminum garnet) phosphor to the surface of the blue-color LED chip 44. Reference numerals 46a and 46b show wires, 47a and 47b terminal portions. The wires 46a and 46b are connected to an electrode on the surface of the blue-color LED chip 44 and the terminal portions 47a and 47b through wire bonding or the like.

Reference numeral 49 shows a holding member formed of a transparent resin to hold the aforementioned members. The blue-color LED chip 44 and the phosphor layer 45 are fixed to a metal cup portion 48 integrally formed with the terminal portions 47a and 47b. The metal cup portion 48 functions as a reflecting mirror.

A white-color LED 41 of the structure described above emits white-color light in the following manner.

The phosphor layer 45 shown in FIG. 18 can convert blue-color light into yellow-color light. Part of the blue-color light radiated by the blue-color LED chip 44 passes through the phosphor layer 45, while the remainder hits the phosphor layer 45 and is converted into yellow-color light. The light components of the two colors can mix to produce white-color light.

No problem occurs if light components in all directions radiated from the white-color LED 41 are of white color. However, when actual color is observed, uniform white-color illumination is not always provided. Specifically, while white-color and bright irradiation is performed in a range of a particular angle or smaller with respect to the irradiation optical axis L, a yellow-color component is larger and brightness tends to reduce in a range of angles larger than the particular angle.

It is contemplated that this is because the length of a light component of the luminous flux passing through the phosphor layer 45 varies depending on the direction thereof emerging from the blue-color LED chip 44. Specifically, as apparent from FIG. 18, a first component emerging at an angle smaller than the particular angle with respect to the irradiation optical axis L has a length passing through the phosphor layer 45 smaller than that of a second component emerging at an angle larger than the particular angle. The first component contains a blue-color component passing through the phosphor layer 45 larger than that in the second component, and produces bluish color close to white. In contrast, the second component has the larger length passing through the phosphor layer 45 and contains a larger component changed to yellow.

From the foregoing, it can be said that it is effective to perform condensing control by considering the direction of the luminous flux emerging from the blue-color LED chip 44, that is, by taking account of the first and second components in order to efficiently use the light of the white-color LED 41 while the occurrence of uneven color is prevented.

The illumination unit of Embodiment 3 is formed in view of the aforementioned points and performs individual condensing control for the first and second components. The first and second components emerging from the illumination unit are overlapped in the required irradiation range to produce luminous flux with uniform color and brightness.

In the following, description will be made of the specific structure of the optical member for use in the illumination unit of Embodiment 3 with reference to FIGS. 15 to 17.

In FIG. 15, reference numeral 41 shows the white-color LED shown in FIG. 18, 42 an optical member for condensing luminous flux emerging from the white-color LED 41, and 43 a circuit substrate to which the white-color LED 41 is electrically and mechanically connected.

The optical member 42 has a first incident surface 42a having a positive refractive power (a positive optical power), a second incident surface 42b, a total reflection surface 42c, and an emergent surface 42d in a flat shape (a surface substantially orthogonal to the irradiation optical axis L). The second incident surface 42b directs a component (the aforementioned second component) incident on the second incident surface 42b of luminous flux emerging from the white-color LED 41 toward the total reflection surface 42c. The total reflection surface 42c totally reflects the component directed from the second incident surface 42b toward the emergent surface 42d.

Next, description will be made of the traces of luminous flux emerging from the white-color LED 41 serving as the light source with reference to FIGS. 16 and 17. FIG. 16 shows the traces of representative light rays associated with the component (the aforementioned first component) at an angle equal to or smaller than the particular angle with respect to the irradiation optical axis L of the luminous flux emerging from the center (the part on the irradiation optical axis L) of the white-color LED 41. The first component contains a large blue-color light component passing through the phosphor layer 45 of the white-color LED 41 as described above.

First, it is necessary to uniformly irradiate the first component to the required irradiation range. In Embodiment 3, the first component is incident on the first incident surface 42a having the positive refractive power and condensed by the first incident surface 42a to achieve efficient irradiation (with a uniform light distribution characteristic) to the required irradiation range.

Next, FIG. 17 shows the traces of representative light rays associated with the component (the aforementioned second component) at an angle equal to or larger than the particular angle with respect to the irradiation optical axis L of the luminous flux emerging from the center of the white-color LED 41. As described above, the second component has a smaller blue-color light component passing through the phosphor layer 45 of the white-color LED 41 and a larger component converted into yellow by the phosphor layer 45. In other words, the second component shows yellowy light.

It is also necessary to uniformly irradiate the second component to the required irradiation range.

In Embodiment 3, the second component is incident on the second incident surface 42b and then totally reflected by the total reflection surface 42c to provide substantially the same angular distribution of the second component emerging from the emergent surface 42d as the angular distribution of the first component. Although not shown in FIG. 17, the second component emerging from the emergent surface 42d has an irradiation angle which is substantially equal to that of the first component shown in FIG. 16 at a certain distance from the emergent surface 42d.

In this manner, the first component showing the bluish color shown in FIG. 16 and the second component showing the yellowy color shown in FIG. 17 can be overlapped in the same irradiation range to produce illumination light with a uniform light distribution characteristic while the occurrence of uneven color is prevented.

With the aforementioned phenomenon, light rays other than the representative light rays shown in FIGS. 16 and 17, that is, luminous flux emerging from the part other than the center of the white-color LED 41 tends to show the traces as shown in FIGS. 16 and 17. This can provide a uniform light distribution characteristic over the entire light-emitting range of the white-color LED 41 while the occurrence of uneven color is prevented.

As described above, the illumination unit of Embodiment 3 can efficiently reduce uneven color caused by the white-color LED 41 serving as the light source and can efficiently (with almost no loss of light quantity) use the luminous flux emerging from the white-color LED 41 to irradiate the luminous flux having the aforementioned desired light distribution characteristic.

Since the emergent surface 42d of the optical member 42 is formed of the flat surface, the illumination unit of Embodiment 3 can be mounted on an optical device such as the video camera shown in FIG. 6 without damaging the appearance of the optical device. In addition, the distance from the white-color LED 41 to the emergent surface 42d of the optical member 42 can be reduced to form a compact optical system as compared with the case where the emergent surface 42d is formed in a shape other than the flat surface (for example, a curved surface).

In Embodiment 3, while the one end of the second incident surface 42b (the part in contact with the reflecting surface 42c) is formed to be positioned within substantially the same plane (within the plane orthogonal to the optical axis) as the emergent surface of the white-color LED 41, the present invention is not limited thereto. For example, the optical member 42 can be formed such that the one end of the second incident surface 42b is positioned across the plane orthogonal to the optical axis and including the emergent surface of the white-color LED from the light irradiation side. Such a structure can prevent the escape of luminous flux sent from the emergent surface of the white-color LED 41 in a direction substantially orthogonal to the irradiation optical axis L from between the white-color LED 41 and the optical member 42, thereby condensing more luminous flux.

While Embodiment 3 employs the optical member 42 having the second incident surface 42b with the linear shape (plane) in section along the plane including the irradiation optical axis L as shown in FIG. 15 and the like, the second incident surface may have a curved shape (curved surface), that is, the second incident surface may have a positive refractive power.

It is also possible to employ the structure of the illumination unit as shown in FIG. 19. Specifically, the illumination unit may have a reflecting member 51 and an optical member 52. In the illumination unit shown in FIG. 19, the aforementioned first component is incident on a first incident surface 52a of the optical member 52 having a positive refractive power for condensing, and then emerges from an emergent surface 53c formed as a flat surface (a surface substantially orthogonal to the irradiation optical axis L). The traces of representative light rays of the first component are similar to those in FIG. 16.

The aforementioned second component is reflected by a reflecting surface of the reflecting member 52 and then incident on a second incident surface 52b (a surface substantially orthogonal to the irradiation optical axis L) of the optical member 52, and emerges from the emergent surface 53c. The traces of representative light rays of the second component are similar to those in FIG. 17.

While the first incident surface 52a having the positive refractive power is formed on the side of the incident surface of the optical member 52 in FIG. 19, the incident surface of the optical member 52 may be formed as a flat surface (a surface substantially orthogonal to the irradiation optical axis) and a lens surface having a positive refractive power may be formed in part of the emergent surface (the area opposite to the first incident surface 52a in the direction of the irradiation optical axis L).

As described above, according to each of Embodiments 1 to 3, the luminous flux from the light source can be efficiently condensed by providing the positive optical power for the emergent surface of the optical member and providing the reflecting surface which reflects part of the light incident from the incident surface toward the emergent surface.

In addition, the first light and the second light can be controlled by the separate surfaces (the first and second surfaces) to provide any light distribution formed by the first and second light with the compact structure.

This application claims foreign priority benefits based on Japanese Patent Application No. 2004-162279, filed on May 31, 2004, which is hereby incorporated by reference herein in its entirety as if fully set forth herein.

What is claimed is:

1. An illumination apparatus comprising:
    a light-emitting diode as a light source; and
    an optical member, which is disposed on the light irradiation side of the light source,
    wherein the optical member includes an incident surface, an emergent surface having a positive optical power, and a reflecting surface reflecting part of light from the incident surface and leading the part of light to the emergent surface, and
    a distance between the reflecting surface and the irradiation optical axis continuously increases from the side close to the incident surface to the side close to the emergent surface, the reflecting surface being formed as arc shape, and the center of the arc shape being located across the arc from the irradiation optical axis.

2. The illumination apparatus according to claim 1, wherein the aperture of the emergent surface is larger than the aperture of the incident surface.

3. The illumination apparatus according to claim 1, wherein the light source has a light-emitting surface which has substantially the same size as the aperture of the incident surface.

4. The illumination apparatus according to claim 1, wherein the optical member is shaped such that the incident surface is adjacent to the reflecting surface and the reflecting surface is adjacent to the emergent surface.

5. The illumination apparatus according to claim 1, wherein the incident surface, the reflecting surface, and the emergent surface have rotationally symmetric shapes with respect to the irradiation optical axis.

6. An image-taking apparatus comprising:
    the illumination apparatus according to claim 1; and
    an image-taking system, which takes an image of an object illuminated with light from the illumination apparatus.

* * * * *